United States Patent [19]

Ogiro et al.

[11] Patent Number: 4,484,248
[45] Date of Patent: Nov. 20, 1984

[54] MAGNETIC RECORDING TAPE CARTRIDGE

[75] Inventors: Kenji Ogiro, Yokohama; Shinichi Gotoh, Kyoto, both of Japan

[73] Assignees: Hitachi Maxell, Ltd., Osaka; Hitachi, Ltd., Tokyo, both of Japan

[21] Appl. No.: 287,800

[22] Filed: Jul. 28, 1981

[30] Foreign Application Priority Data

| Jul. 28, 1980 | [JP] | Japan | 55-105598[U] |
| Jul. 28, 1980 | [JP] | Japan | 55-105599[U] |
| Jul. 28, 1980 | [JP] | Japan | 55-105601[U] |
| Sep. 2, 1980 | [JP] | Japan | 55-125456[U] |
| Sep. 2, 1980 | [JP] | Japan | 55-125427[U] |

[51] Int. Cl.³ ............................................. G11B 23/02
[52] U.S. Cl. ............................................. 360/132
[58] Field of Search ................ 242/182, 197–200; 360/93, 96.5, 96.6, 131, 132, 134, 137

[56] References Cited

U.S. PATENT DOCUMENTS

| 3,900,170 | 8/1975 | Serizawa | 360/96.6 X |
| 4,173,319 | 11/1979 | Umeda | 360/132 X |
| 4,214,719 | 7/1980 | Kato | 242/198 |
| 4,235,395 | 11/1980 | Wardenaar et al. | 360/132 X |

*Primary Examiner*—Aristotelis M. Psitos
*Assistant Examiner*—Kin Wong
*Attorney, Agent, or Firm*—Birch, Stewart, Kolasch & Birch

[57] ABSTRACT

A magnetic recording tape cartridge having a rotatable lid member on a front face of the cartridge such as a video tape cassette which comprises an engaging member projecting from the lid member to the interior of the cartridge case, a movable locking member detouchably engaged with the engaging member of the lid member to lock the lid member in a closed position and to release the engagement of the locking member from the engaging member, and a throughhole defined to allow passage of a lock releasing pin of a recording/reproducing apparatus.

11 Claims, 46 Drawing Figures

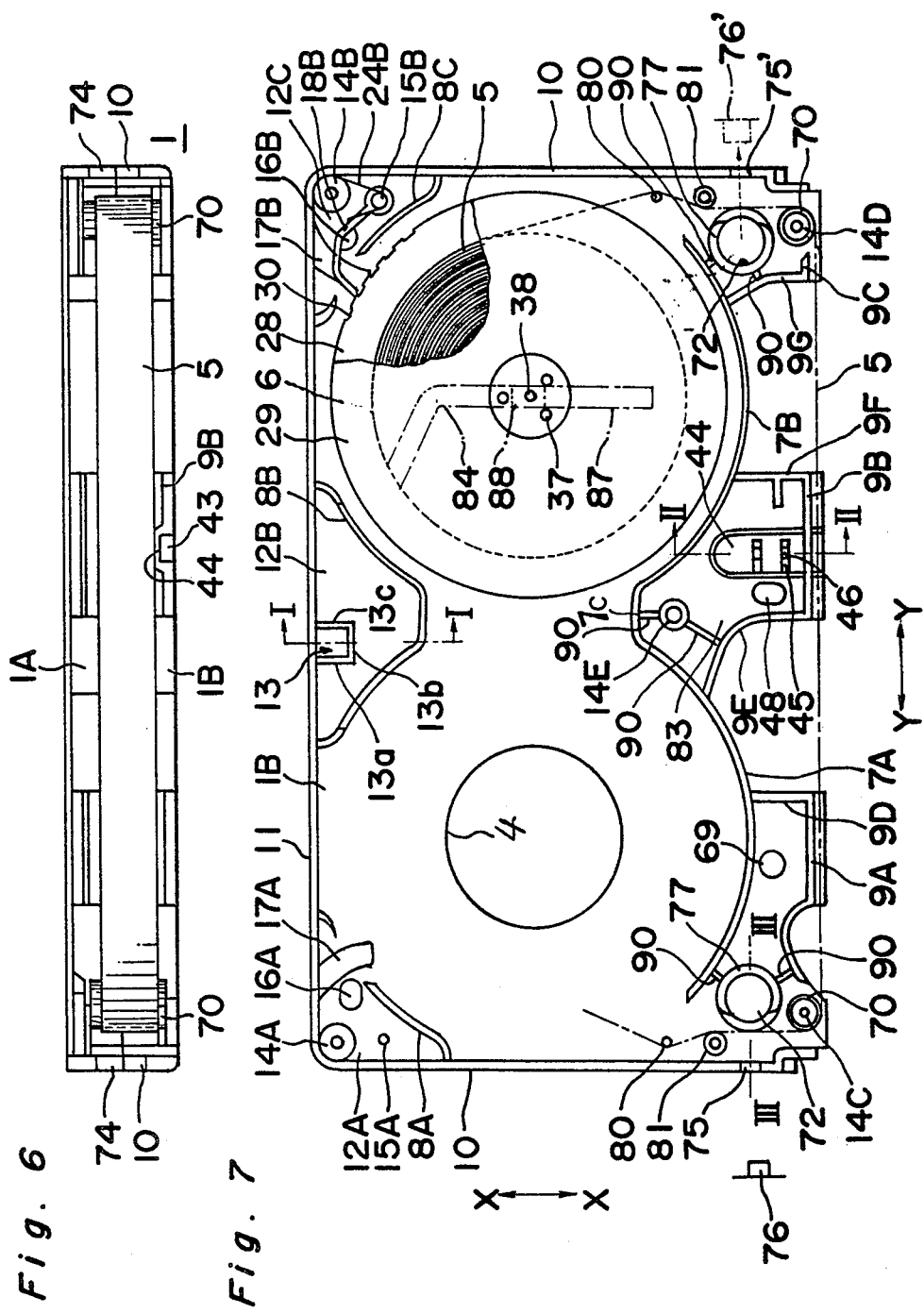

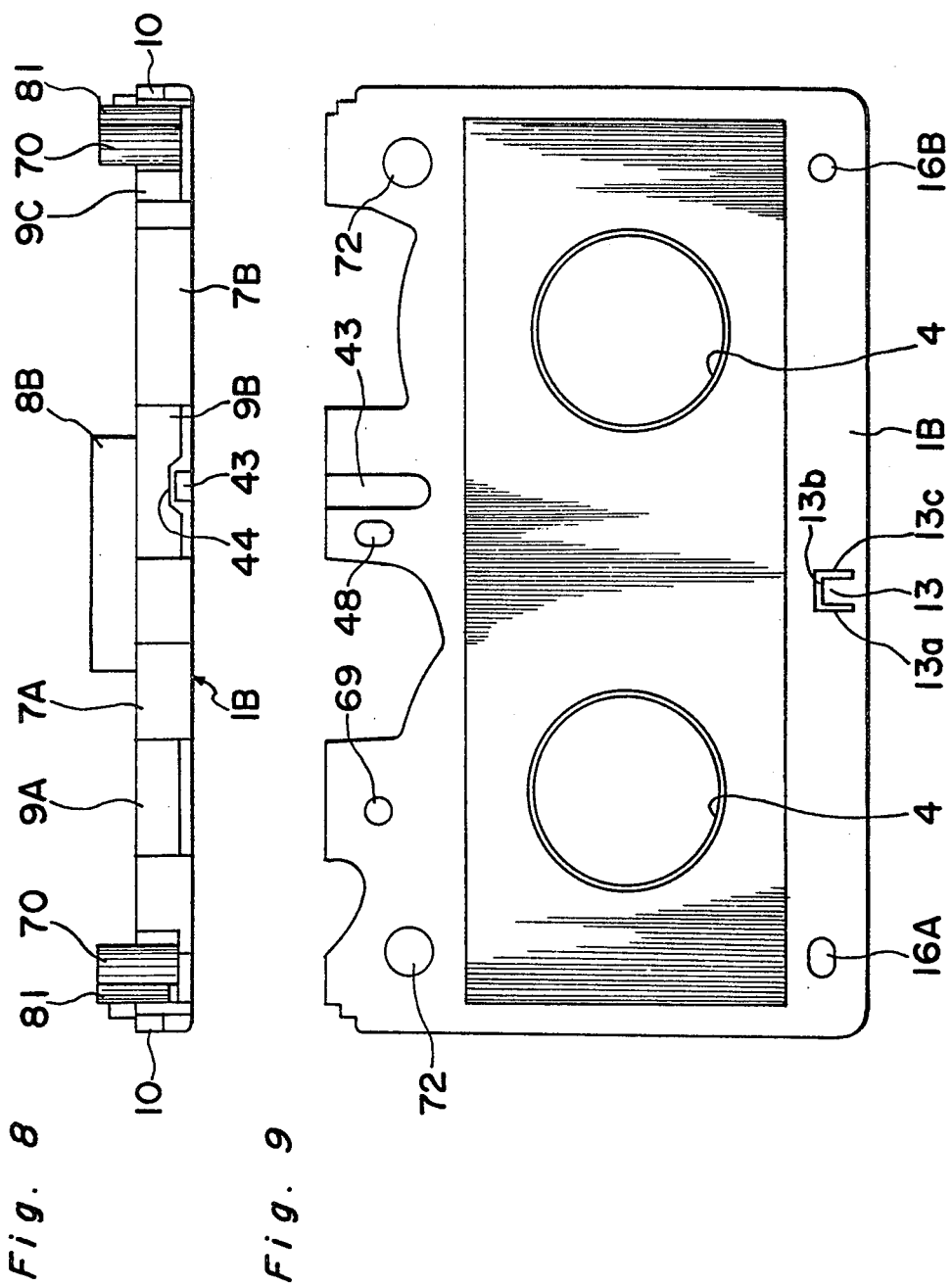

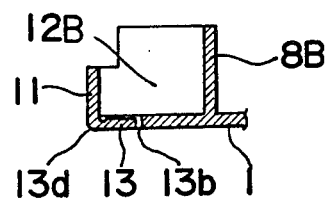
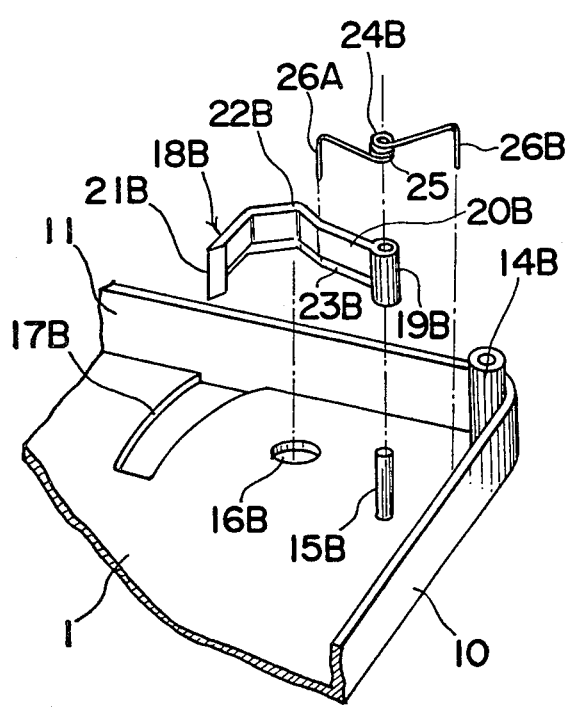
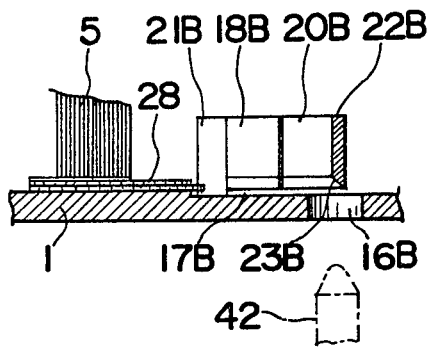
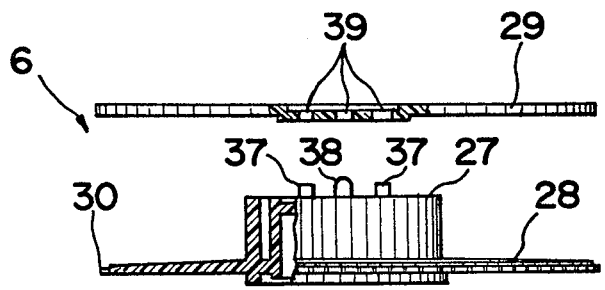
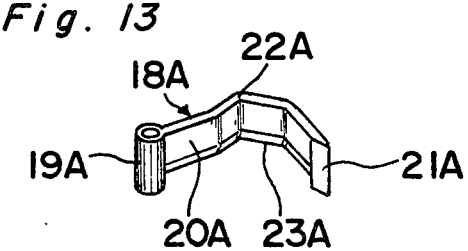

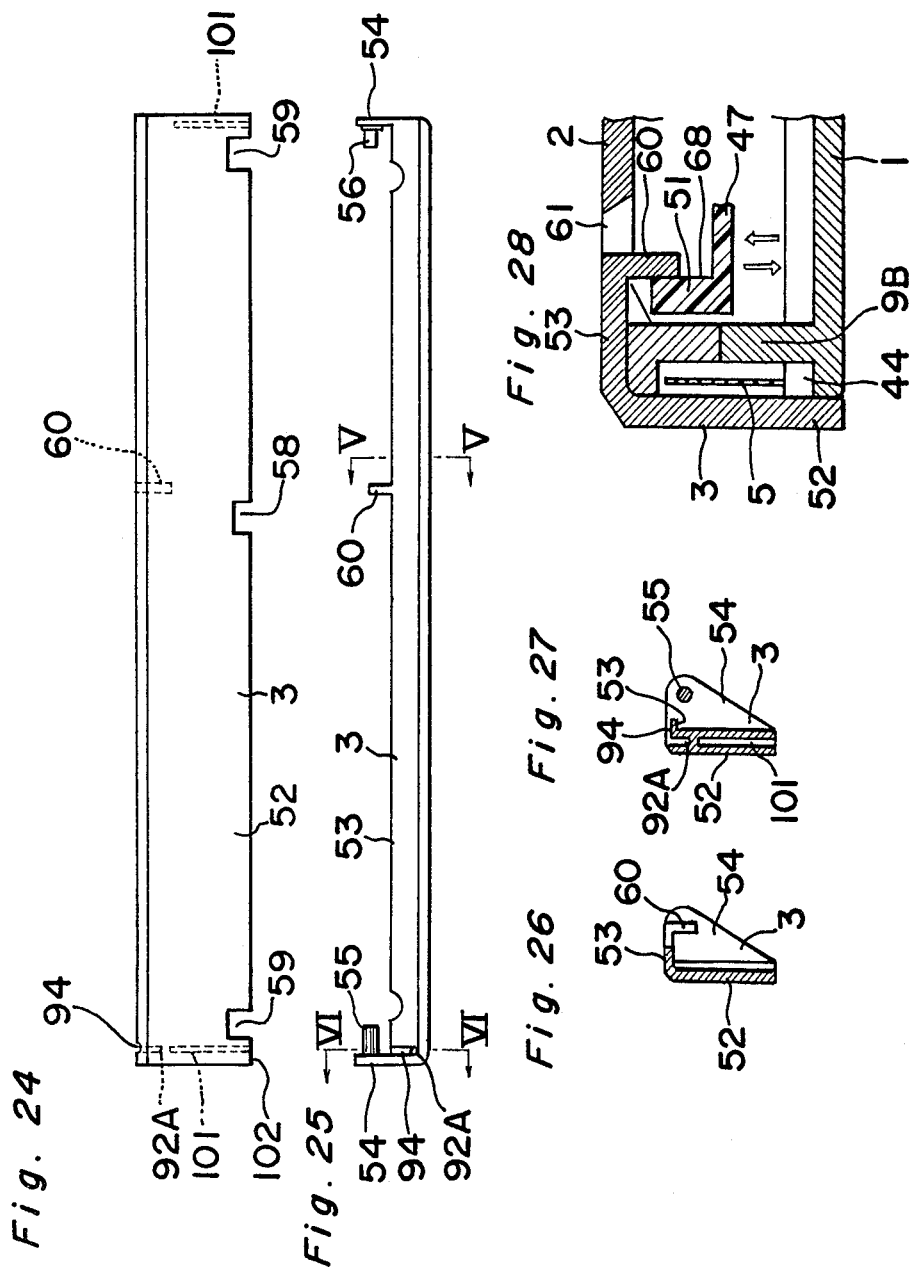

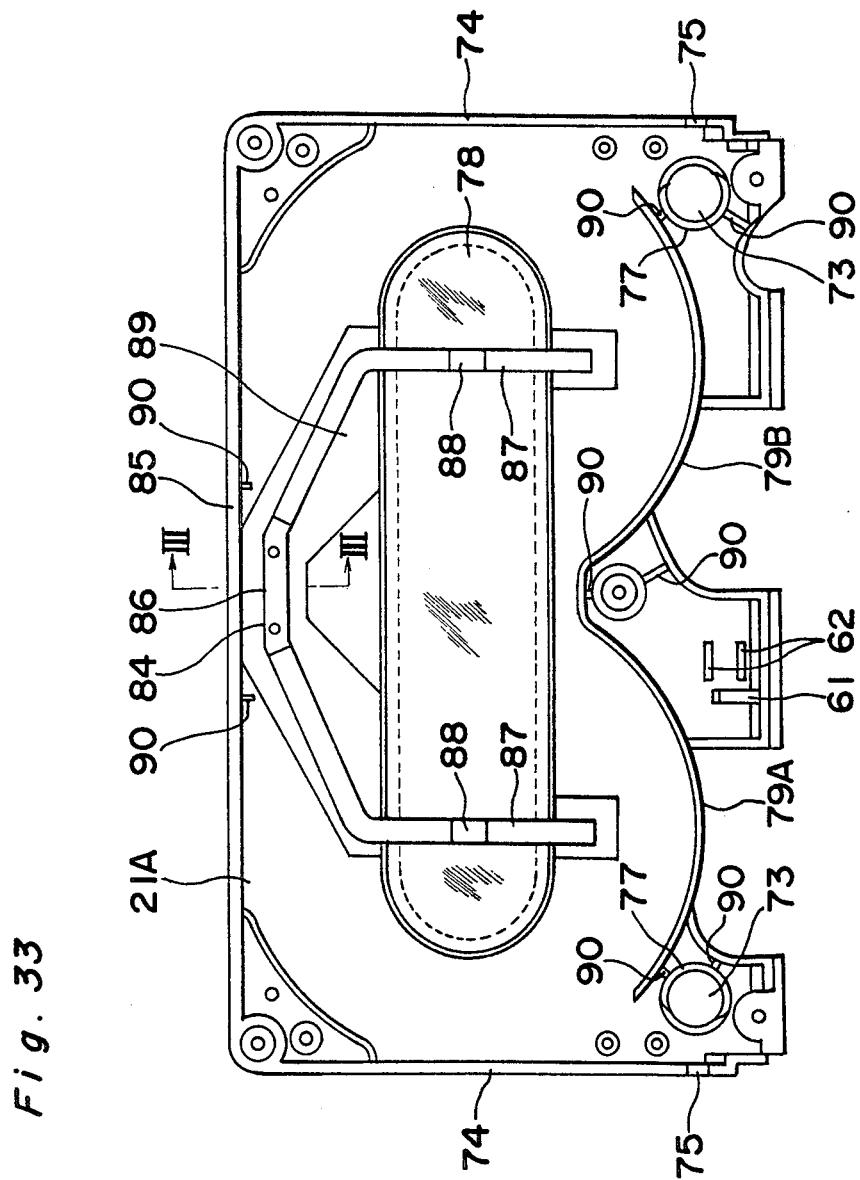

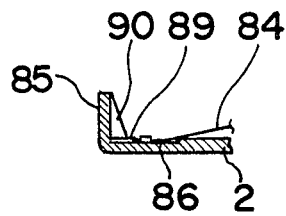
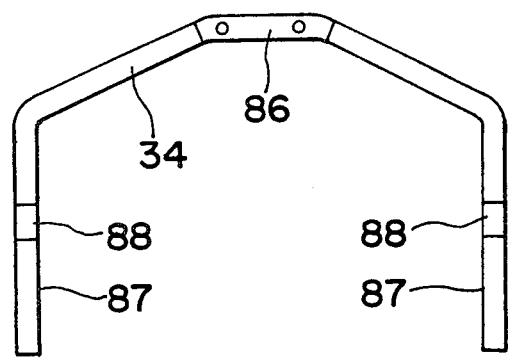
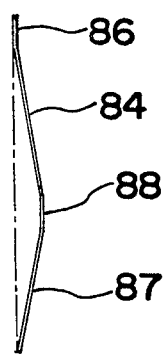
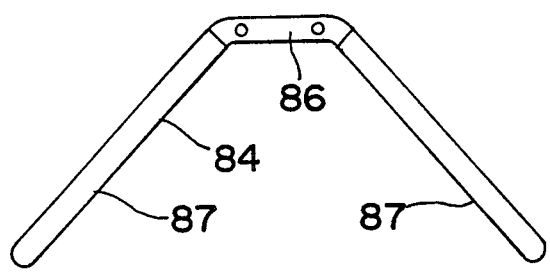
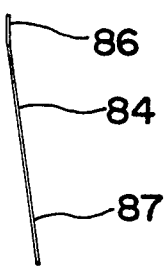
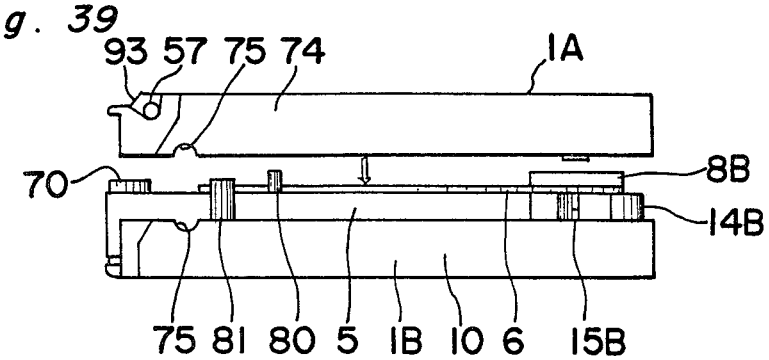

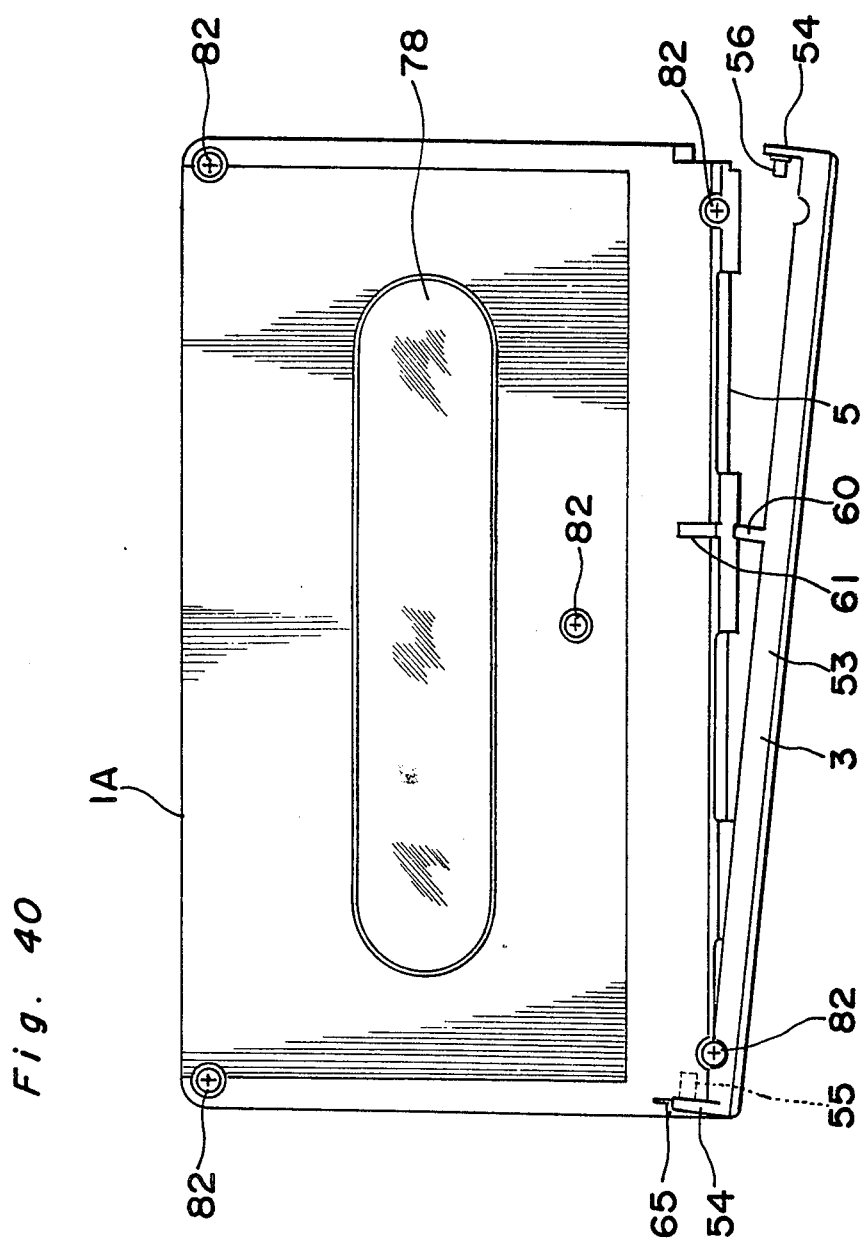

MAGNETIC RECORDING TAPE CARTRIDGE

FIELD OF THE INVENTION

The present invention relates to a magnetic recording tape cartridge, and in particular, it relates to a magnetic recording tape cartridge provided with a locking mechanism for locking rotation of at least one tape reel on which a magnetic recording tape is wound and a rotatable lid member for closing a front face of the cartridge to protect the magnetic recording tape extending along the front face.

BACKGROUND OF THE INVENTION

Such a magnetic recording tape cartridge is known as a video tape cartridge for use in recording and/or reproducing video signals in a magnetic recording tape, and such video tape cartridges comprise a pair of reels for winding the recording tape, the reels being driven by driving shafts of a recording/reproducing apparatus, a tape reel locking mechanism for preventing rotation of the reels to keep the intermediate portion of the recording tape, which extends along the front face of the cartridge, stretched when the cartridge is not used and a rotatable lid member mounted on the front side of the cartridge to close the front face thereof to protect the intermediate portion of the recording tape existing along the front face. Furthermore, the recording tape cartridges are provided with a mechanism for releasing the reel locking mechanism when in use and a mechanism either for locking the lid member in the closed position or for releasing the lid member to allow to open the front face of the cartridge when in use.

Conventional video tape cartridges, however, have various drawbacks as hereinafter explained which become remarkably apparent upon decreasing the size of the cartridge.

A locking mechanism for the rotatable lid member for the case of a conventional magnetic recording tape cartridge will hereinafter be described with reference to FIGS. 1 and 2.

The cartridge case 201 comprises a top section 202 and a bottom section 203, and contains therein a magnetic recording tape 204 and a pair of reels (not shown) for winding the magnetic recording tape 204. The cartridge case 201 has an opening 205 in its front surface for drawing the magnetic recording tape 204 out from the case 201 when the record in the magnetic recording tape 204 is to be reproduced so that a portion of the magnetic recording tape 204 is continuously exposed outwardly along the front surface of the cartridge case 201. A rotatable lid member 206 is rotatably supported on the front side of the cartridge case 201 to protect the magnetic recording tape 204 from dust and contact with the hands of an operator.

The rotatable lid member 206 has a front plate 207 for covering the front side of the cartridge case 201, a pair of side plates 208A and 208B provided on both sides of the front plate 207 and a pair of pivotal pins 209 inwardly projecting from the inner surfaces of the side plates 208A and 208B respectively. When the magnetic recording tape cartridge is not in use, the rotatable lid member 206 is in a closed condition to cover the magnetic recording tape 204 exposed along the front surface of the cartridge case 201. In this case, the rotatable lid member 206 is kept closed by a lock means as hereinafter described. When the magnetic recording tape cartridge is mounted in a recording/reproducing apparatus, locking of the rotatable lid member 206 is released by a release member (not shown) of the recording/reproducing apparatus so that the rotatable lid member 206 is rotated to place the magnetic recording tape cartridge in a condition capable of reproducing the record therein.

In the corner of the front surface of the bottom section 203, there is provided a chamber 210 within which a lock plate (not shown) is pivotally contained to be rotatable along a direction perpendicular to the direction of rotation of the rotatable lid member 206. In the side surface of the lock plate, there are provided first and second projections 211 and 212 at a predetermined space to project outwardly through a side wall 213 of the bottom section 203, and the lock plate is elastically pressed against the side wall 213 of the bottom section 203 by a spring member (not shown). In the side plate 208A of the rotatable lid member 206 opposite to the chamber 210, there is provided a recess 214 for engagement with the first projection 211 of the lock plate.

When the rotatable lid member 206, in an opened condition as shown in FIG. 44, is to be closed, an end 215 of the side plate 208A of the rotatable lid member 206 comes in contact with the first projection 211 extending beyond the side wall 213 of the bottom section 203. Since the inner surface of the end 215 is tapered, the end 215 passes over the first projection 211 to press the same so that the lock plate is rotated toward the interior of the cartridge case 201 against the elasticity of the spring member. And when the rotatable lid member 206 is further rotated, the free end of the first projection 211 is engaged in the recess 214 of the side plate 208A so that the rotatable lid member 206 is locked in a closed condition by engagement with the lock plate. In this condition, as shown in FIG. 2, the second projection 212 extends outwardly beyond the side wall 213 to be exposed between the end 215 of the side plate 208A and a stepped portion 216 of the side wall 213 of the bottom section 203.

When the magnetic recording tape cartridge is mounted in a recording/reproducing apparatus with the rotatable lid member 206 kept in a closed condition, the second projection 212 of the lock plate is pressed by a locking release member in the recording/reproducing apparatus inwardly into the cartridge case 201. By virtue of this, the lock plate is rotated against the elasticity of the spring member so that the first projection 211 is disengaged from the recess 14 to release engagement of the rotatable lid member 206 and the lock plate. Then the magnetic recording tape cartridge is lowered within the recording/reproducing apparatus so that an end of the rotatable lid member 206 is caught by a lid opening member (not shown) provided in the recording/reproducing apparatus to be rotated and opened with the lowering of the magnetic recording tape cartridge, thereby exposing the magnetic recording tape 204 as shown in FIG. 1.

As hereinabove described, the conventional magnetic recording tape cartridge is provided in its cartridge case 201 with the chamber 210 exclusively containing the lock plate requiring a wide space for rotation of the lock plate and accommodation of the spring member, and the chamber 210 inevitably occupies a large space. There are further required spaces for extending the second projection 212 between the end 215 of the rotatable lid member 206 and the stepped portion 216 of the bottom section 203 and for inserting the locking release member with respect to the second projection 212. Such requirements in space hinder the reduction in size of the magnetic recording tape cartridge, and further, location of the lock means is limited to the corner of the front surface of the bottom section 203, leading to insufficiency of tolerance in design.

Since, in addition, the rotatable lid member 206 is locked at one end at the side plate 208A, the other side plate 208B tends to be slightly opened by deformation of the rotatable lid member 206 upon receipt of external force for opening the rotatable lid member 206 thereby reducing the function of the rotatable lid member 206.

There is another type of a conventional magnetic recording tape cartridge which has a recess for receiving a locking release member in the lower end of the front plate of the rotatable lid member and a locking release lever provided in the cartridge case in a portion opposite to a recess differing from the lock means as shown in FIGS. 1 and 2. The locking release member is inserted into the recess so as to press a tapered forward end of the locking release lever so that the locking release lever in engagement with the rotatable lid member is rotated to be disengaged from the same.

In this type of magnetic recording tape cartridge, however, the lower end of the magnetic recording tape exposed along the front surface of the cartridge case is apt to be damaged by the locking release member inserted through the recess. For preventing such damage of the magnetic recording tape, it is necessary to separate the insertion path of the locking release member from the magnetic recording tape at a certain space, leading to difficulty in reducing the size of the magnetic recording tape cartridge and insufficiency of tolerance in design.

An example of a conventional locking mechanism of the tape reel is now described with reference to FIG. 3. The mechanism is provided in the vicinity of a rear wall 302 of a bottom section 203 of the cartridge case, and comprises a through-hole 303 for receiving a release pin (not shown), a pawl member rotation lever 304, two pawl members 305 and two coiled springs 306. The through-hole 303 is formed in a substantially central portion of the bottom section 203 in the vicinity of the rear wall 302, and is exclusively used for receiving the release pin (not shown). The lever 304 comprises a block member 307 for closing an upper open end of the through-hole 303, a column 308 connected with the bottom of the block member 307 and a pair of pressing portions 309 extending from the columns 308 substantially perpendicularly with respect to the block member 307. The lever 304 is rotatably carried on a pair of projections 310 extending from the rear wall 302 toward the through-hole 303. Each of the pawl members 305 comprises a cylindrical body 312 rotatably engaged with the outer periphery of a shaft 311 projectingly formed in the bottom section 203, an arm 313 being in contact with the pressing portion 309 of the lever 304 and a pawl 315 extending toward a reel 314. The shaft 311 is engaged in its upper end with a coiled spring 306 which has an end being in contact with a contact pin 316 projecting from the bottom section 203 and another end being in contact with the pawl 315 of the pawl member 305. By virtue of the elasticity of the coiled spring 306, the pawl 315 and the block member 307 of the pawl member 305 are respectively pressed against the reel 314 and to close the through-hole 303. A plurality of grooves 318 are formed in the outer periphery of a flange 317 of the reel 314 so that rotation of the reel 314 is stopped by the forward end of the pawl 315 engagingly entering the groove 318.

When this type of magnetic recording tape cartridge is mounted in a recording/reproducing apparatus, the magnetic recording tape cartridge is lowered with respect to the recording/reproducing apparatus so that two standard pins (not shown) provided in the recording/reproducing apparatus are inserted into a pair of through-holes 319 formed in the front surface of the bottom section 203 of the magnetic recording tape cartridge for location of the same. A rotation stoppage release pin (not shown) provided in the recording/reproducing apparatus is inserted into the through-hole 303 so that the block member 307 is raised against elasticity of the coiled spring 306. By virtue of this, the pressing portion 309 of the pawl member rotation lever 304 falls toward the rear wall 302 thereby rotating the pawl member 305 about the shaft 311 so that the pawl 315 is disengaged from the groove 318 to allow rotation of the reel 314.

In this type of conventional magnetic recording tape cartridge, however, the bottom section 203 requires a large space for providing the through-hole 303 for receiving the release pin and the through-holes 319 for receiving standard pins which are formed individually, leading to difficulty in reducing in size the magnetic recording tape cartridge. Further, the parts of the conventional locking mechanism for stopping the tape reel are complicated in shape and construction, requiring complex mold designs and steps for assembling each of the components.

SUMMARY OF THE INVENTION

It is, therefore, an essential object of the present invention to provide a magnetic recording tape cartridge having a simple construction regarding the tape reel locking and releasing mechanism and lid locking mechanism.

Another object of the present invention is to provide a magnetic recording tape cartridge which may be readily reduced in size.

According to the present invention, there is provided a magnetic recording tape cartridge comprising a bottom section and a top section assembled together by a fastening means so as to provide a cartridge case having a front wall and a tape chamber with a plurality of openings formed in the front wall, and at least one reel accommodated in the tape chamber, rotatably mounted relative to a drive shaft insertion hole defined in a bottom plate of the bottom section of the cartridge case. A magnetic recording tape is wound around the reel, the intermediate portion of the recording tape being stretched along a predetermined path defined by the front wall. A lid member is hingedly mounted on the cartridge case having a generally straight lid plate disposed generally parallel with the front wall to close the openings of the front wall to protect the magnetic recording tape situated along the front wall, the lid member being rotated in a direction away from the front wall when the tape is in use. An engaging member is provided projecting from the lid member to the interior of the cartridge case through an opening defined in the front portion of the cartridge case. A lock means having a locking member is rotatably mounted in the interior of the cartridge case with the locking member detachably engaging the engaging member of the lid member to lock the lid member in a closed position, the lock means being further operational to release the engagement of the locking member from the engaging member of the lid member to allow the lid member to move to an opened position, and a through-hole is defined to oppose a part of a locking means in the bottom face of the bottom section to allow passage of a lock releasing pin of a tape player.

BRIEF EXPLANATION OF THE DRAWINGS

FIG. 6 is a front elevational view of the magnetic recording tape cartridge of the present invention with the rotatable lid member being removed;

FIG. 7 is a top plan view of a bottom section of the magnetic recording tape cartridge with one of the reels being mounted;

FIG. 8 is a front elevational view of a bottom section of the magnetic recording tape cartridge;

FIG. 9 is a bottom plan view of the bottom section of FIG. 8;

FIG. 10 is a cross sectional view taken along the line I—I in FIG. 7;

FIG. 11 is an exploded perspective view of the member for preventing rotation of the reels;

FIG. 12 is a partial cross sectional view of the member of FIG. 11;

FIG. 13 is a perspective view of the member for preventing rotation of the reels as disposed in the left-hand direction;

FIG. 14 is a partially fragmentary exploded front elevational view of the reel;

FIG. 24 is a front elevational view of the rotatable lid member;

FIG. 25 is a top plan view of the rotatable lid member;

FIG. 26 is a partial cross sectional view taken along the line V—V in FIG. 25;

FIG. 27 is a cross sectional view taken along the line VI—VI in FIG. 25;

FIG. 28 is an enlarged cross sectional view of a principal part of the rotatable lid member in which the lid member is closed;

FIG. 33 is a bottom plan view of the top section;

FIG. 34 is a cross sectional view taken along the line VII—VII in FIG. 33;

FIG. 35 is a top plan view of a spring plate;

FIG. 36 is a side elevational view of the spring plate of FIG. 35;

FIG. 37 is a top plan view of a modified spring plate;

FIG. 38 is a side elevational view of the modified spring plate of FIG. 37;

FIG. 39 is a side elevational view of the magnetic recording tape cartridge showing assembling thereof;

FIG. 40 is a top plan view of the magnetic recording tape cartridge showing a way of assembling the rotatable lid member;

DESCRIPTION OF THE PREFERRED EMBODIMENT

Figure 1:
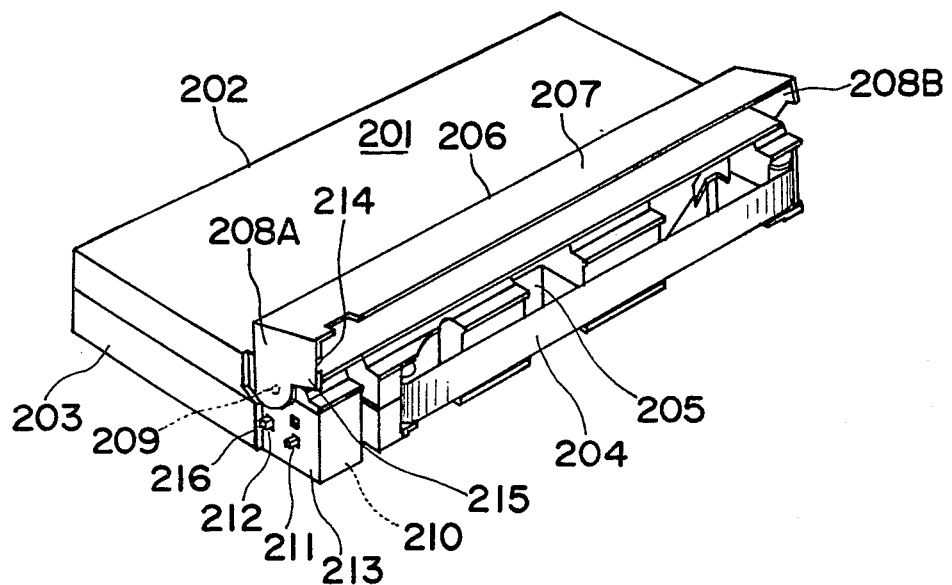
FIGS. 1 and 2 are perspective view and side elevational views of a conventional magnetic recording tape cartridge.
Figure 2:
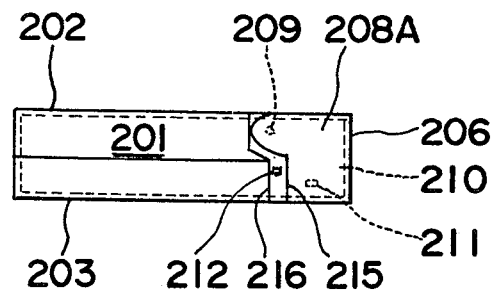
Figure 3:
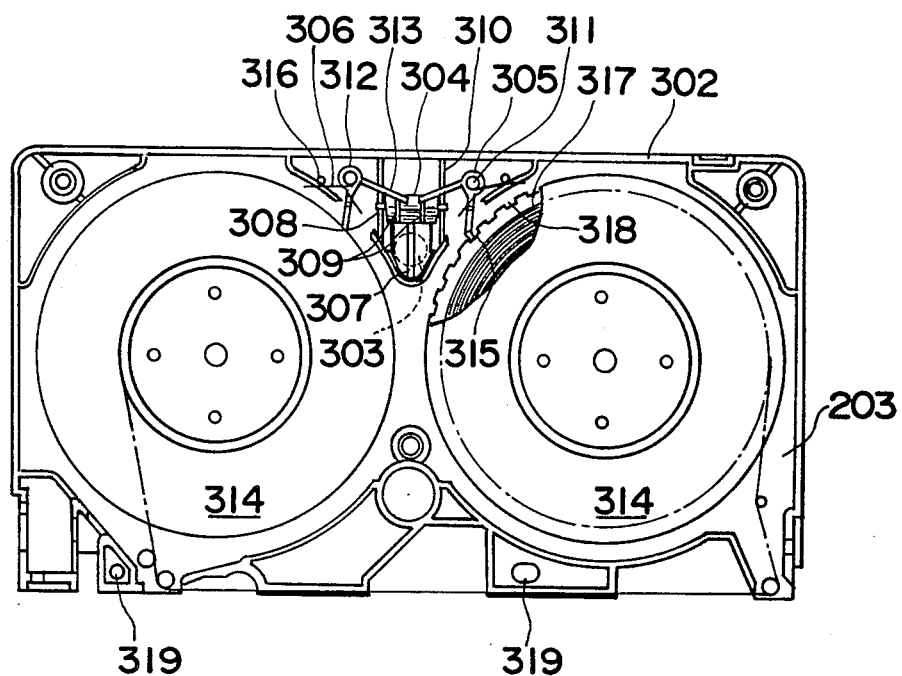
FIG. 3 is a top plan view of a conventional magnetic recording tape cartridge from which the top section is removed.
Figure 4:
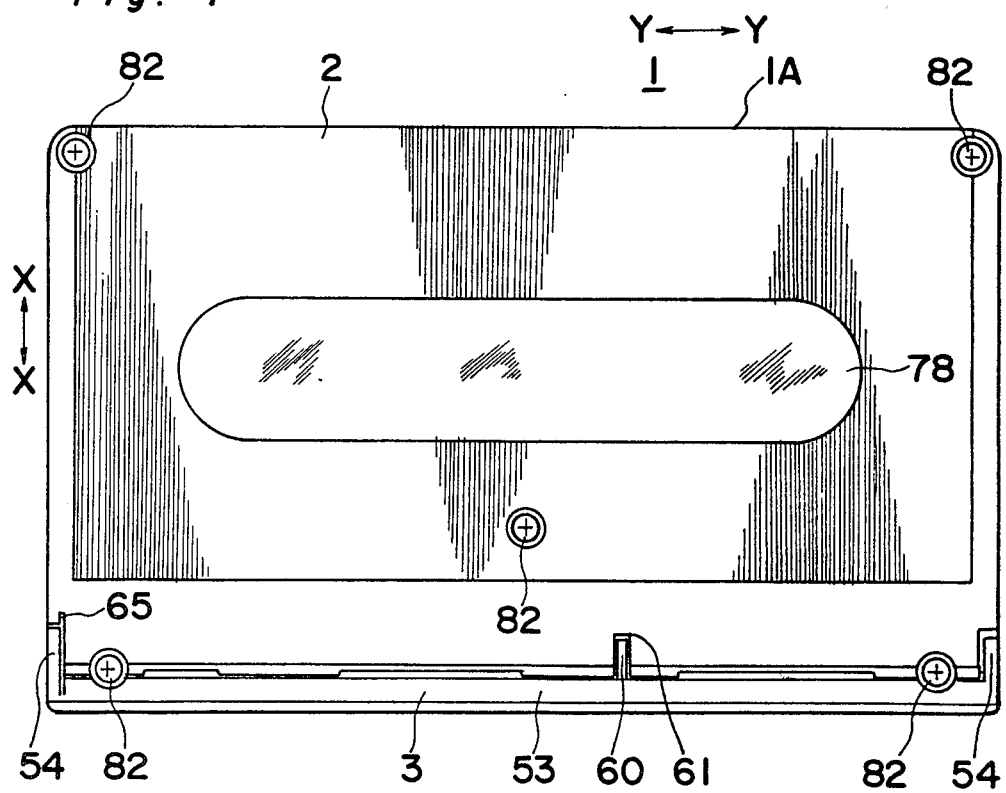
FIG. 4 is a top plan view of a magnetic recording tape cartridge according to the present invention.
Figure 5:
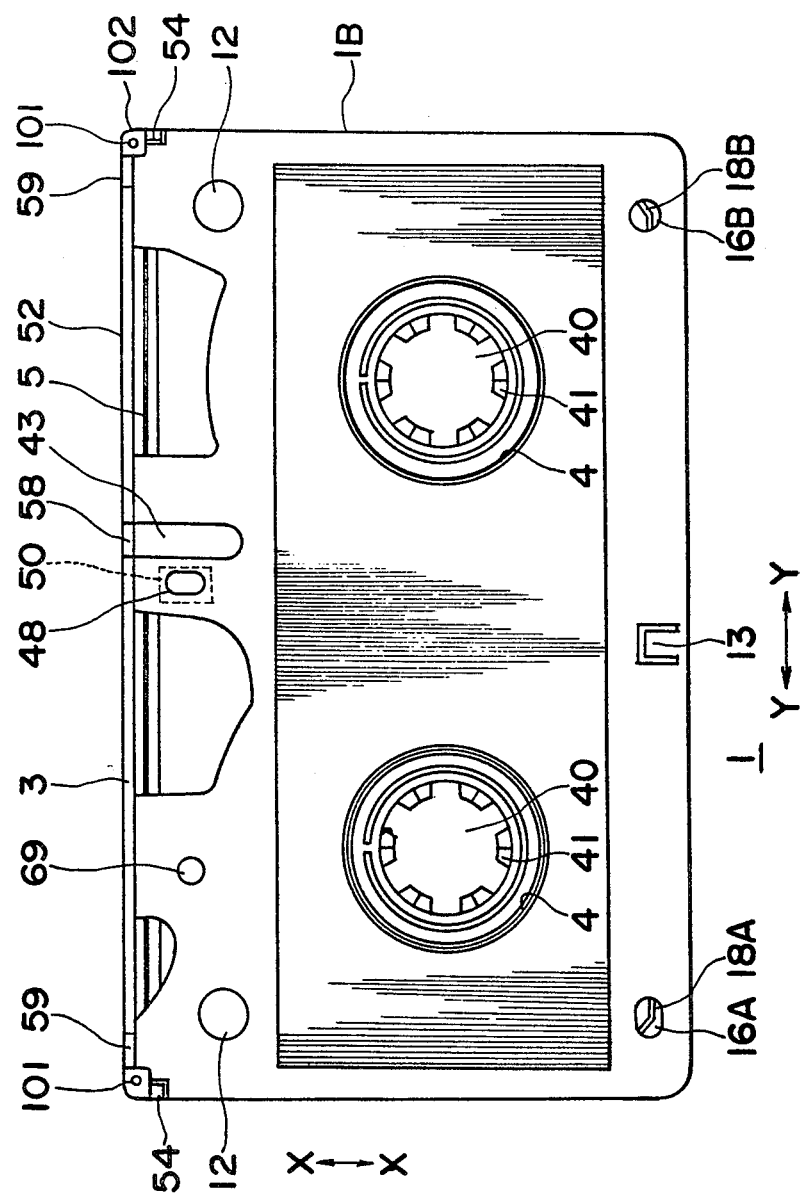
FIG. 5 is a bottom plan view of the magnetic recording tape cartridge of FIG. 4.

Referring now to FIGS. 4 to 6, there is seen a magnetic recording tape cartridge of the present invention comprising a case generally designated 1 composed of a top section 1A, a bottom section 1B, and an elongated lid member 3 rotatably mounted on the front portion of the top section 1A, each portion being made of a plastic material, such as polystyrene resin.

As shown in FIGS. 5 and 7, the bottom section 1B is provided at the generally central portion relative to a longitudinal direction X of the case 1 with a pair of through-holes 4 at a predetermined space relative to a lateral direction Y of the case 1 for receiving drive shafts of a recording/reproducing apparatus. A pair of reels 6 for winding a magnetic recording tape 5 are respectively rotatably mounted in the through-holes 4. Around the reels 6, there are provided front inner walls 7A and 7B and rear inner walls 8A, 8B and 8C respectively defining some clearances between the same and the outer peripheries of the reels 6, and the inner walls 7 and 8 are integrally formed with the bottom section 1B.

Each of the front inner walls 7A and 7B is formed by an arcuate wall conforming to part of the circular edge of the reel 6 and the front inner walls 7A and 7B are connected with each other by an intermediate wall 7C.

The intermediate portion of the left side front inner wall 7A is connected with the right end portion of the left front outer wall 9A by means of a connecting wall 9D extending in the longitudinal direction X.

The left side front inner wall 7A is also connected with the left end portion of the intermediate front wall 9B by an arcuate connecting wall 9E, and the intermediate portion of the right hand side front inner wall 7B is connected with the right end of the intermediate front wall 9B by a connecting wall 9F so as to define a chamber for accommodation of a lid locking device, the details of which will be described hereinafter.

The right side front inner wall 7B is also connected with the right front wall 9C through a connecting wall 9G which extends from the right end portion of the front inner wall 7B to the left end of the right front wall 9C.

The right side rear inner wall 8C extends from a right side wall 10 towards a rear wall 11 to define a chamber 12C having generally a triangular shape in plan view for mounting a tape reel locking device in the rear corner of the bottom section 1B.

A similar chamber 12A is also defined in the left side rear corner of the bottom section 1B by the left side rear inner wall 8A.

The rear inner wall 8B having generally a V-shaped configuration in plan view has its both ends connected with the rear wall 11 in the intermediate portion thereof to form a central chamber 12B of generally a triangular shape in plan view. The central rear inner wall 8B is made higher than the rear wall 11 so that the upper end thereof comes close to the bottom inner surface of the top section 1A upon assembling of the bottom section 1B and the top section 1A.

The bottom section 1B is integrally provided in its bottom surface with an erase preventing member 13 of the magnetic recording tape in the interior of the central chamber 12B for preventing erroneous erasure of records.

The erase preventing member 13 is formed in the form of a foldable flap defined by slots 13a through 13c in the bottom face of the bottom section 1B with its one side connected with the foot portion of the rear wall 11 through a thinned portion 13d as shown in FIG. 10 so that the erase preventing member can be easily separated from the bottom section 1B. When the erase preventing member 13 is separated from the bottom plate 1B upon being bent and the member 13 thus separated received in the chamber 12B, it will neither engage with and damage the magnetic recording tape nor obstruct rotation of the reels 6.

Within a chamber 12A defined by the rear inner wall 8A in the left-hand direction, the side wall 10 and the rear wall 11, there are projected a boss 14A and a pivotal shaft 15A, and there are further defined a slightly elongated through-hole 16A for receiving a standard pin of a recording/reproducing apparatus and an arcuate guide groove 17A arching about the pivotal shaft 15A. Within a chamber 12C defined by the rear inner wall 8C in the right-hand direction, the side wall 10 and the rear wall 11, there are also provided a boss 14B, a pivotal shaft 15B, a circular hole 16B for receiving a standard pin and an arcuate guide groove 17B, all of which are positioned symmetrically with the boss 14A, the pivotal shaft 15A, the elongated hole 16A and the guide groove 17A.

A rotation preventing member 18B for stopping rotation of the reel 6 is rotatably engaged with the pivotal shaft 15B. The rotation preventing member 18B is formed of a synthetic resin having a low coefficient of friction, and comprises a sleeve 19B (FIG. 11) engaged with the outer periphery of the pivotal shaft 15B, a receiving member 20B extending from the outer periphery of the sleeve 19B and a pawl 21B formed in the forward end of the receiving member 20B (see FIG. 11). The lower end of the pawl 21B extends slightly downwardly of the lower ends of the sleeve 19B and the receiving member 20B so that the lower end of the pawl 21B enters the guide groove 17B upon engagement of the rotation preventing member 18B and the pivotal shaft 15B. The receiving member 20B is provided with an L-shaped bent portion 22B in a part opposite to the elongated hole 16B when the rotation preventing member 18B is engaged with the pivotal shaft 15B. The receiving member 20B is further provided in the inside of its lower end with an inclined portion 23B inclined with an angle of about 30° to 60°.

A rotation preventing member 18A to be engaged with the left-hand pivotal shaft 15A is, as shown in FIG. 13, symmetrical with the aforementioned rotation preventing member 18B, and also comprises a sleeve 19A, a receiving member 20A and a pawl 21A, in which the receiving member 20A is provided with a bent portion 22A in its center and an inclined portion 23A in its lower end.

A spring member 24B formed by a coiled spring is loosely fitted with the pivotal shaft 15B with interposition of the rotation preventing member 18B therebetween. As shown in FIG. 11, the spring member 24B has in its center an annular portion 25 formed by a plurality of windings, and the free end portions extending from the annular portion 25 are both bent in the longitudinal direction of the annular portion 25 to form elastic free ends 26A and 26B. The annular portion 25 is loosely fitted with the head of the pivotal shaft 15B with the elastic ends 26A and 26B slightly pressed against the elasticity of the spring member 24B and simultaneously inserted into the clearance between the side wall 10 and the receiving member 20B, and thereafter the elastic ends 26A and 26B are released. Then, by virtue of the restoring force of the spring member 24B, the elastic ends 26A and 26B are elastically made in contact with the outer surface of the receiving member 20B and the inner surface of the side wall 10 respecitvely, and the pawl 21B of the rotation preventing member 18B is elastically pressed against the reel 6 by the spring member 24B. Such construction simplifies provision and supporting of the spring member 24B.

As shown in FIG. 14, each of the reels 6 comprises a lower flange 28 having a hub 27 integrally projecting therefrom and an upper flange 29. The lower flange 28 is made of opaque synthetic resin, and has a plurality of teeth 30 formed at regular intervals along the entire outer periphery thereof.

Figure 15:
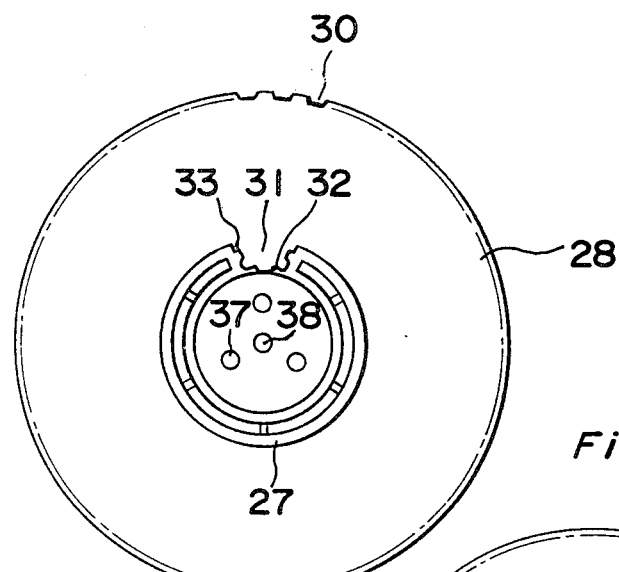
FIG. 15 is a top plan view of a lower flange of the reel.
Figure 17:
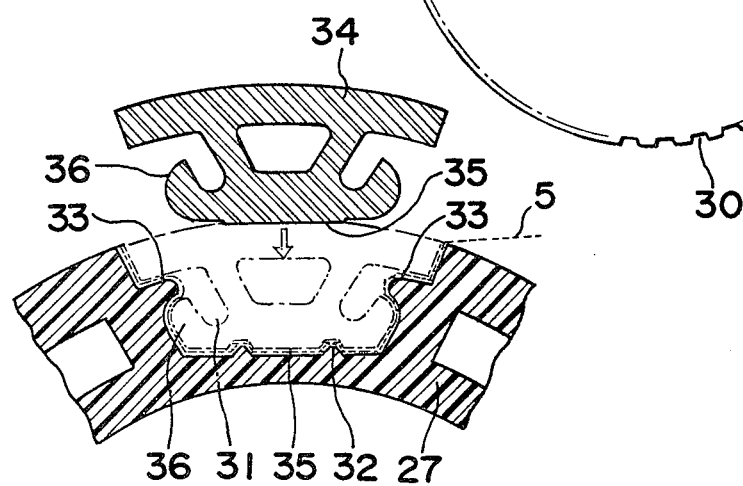
FIG. 17 is an enlarged cross sectional view of a principal part of the reel showing the condition of engagement of a tape stopper.

As shown in FIGS. 15 and 17, the hub 27 is provided in its outer periphery with a concave portion 31 opening toward the outer peripheral surface of the hub 27 for engagement with a tape stopper as hereinafter described. The concave portion 31 is provided in its bottom with one or more tape nippers 32 and in both side walls with a pair of projections 33. A tape stopper 34 to be engaged with the concave portion 31 through an end of the magnetic recording tape 5 has a lower end surface 35 which is flat at least in a portion opposite to the tape nipper 32 and a pair of elastic projections 36 having some flexibility on both sides of the lower end surface 35 (see FIG. 17). Therefore, when the tape stopper 34 is pressed into the concave portion 31 through the end of the magnetic recording tape 5, the elastic projections 36 are both inwardly pressed to be deformed and go beyond the projections 33 of the concave portion 31 respectively, thereby making the tape stopper 34 inserted within the concave portion 31. Upon insertion within the concave portion 31, the tape stopper 34 is prevented from being disengaged from the concave portion 31 by function of the projections 33 as stoppers. The magnetic recording tape 5 is securely held between the tape nipper 32 and the lower end surface 35 of the tape stopper 34 by pressing force of the tape stopper 34 and between the elastic projections 36 and the projections 33 by the elastic force of the elastic projections 36 respectively so that the end of the magnetic recording tape 5 comes in contact with the hub 27.

As shown in FIGS. 14 and 15, the hub 27 has in its upper portion bonding projections 37 for bonding the upper flange 29 to the hub 27 and a central projection 38 of the reel 6. The upper flange 29, made of transparent synthetic resin, has holes 39 for receiving the bonding projections 37 and the central projection 38 of the hub 27 (see FIG. 14). After the bonding projections 37 and the central projection 38 are inserted into the holes 39, the upper ends of the bonding projections 37 are thermally bonded to the upper flange 29 to secure the upper flange 29 to the hub 27. The central projection 38 passes through a hole 39 to project outwardly from the upper flange 29.

Figure 16:
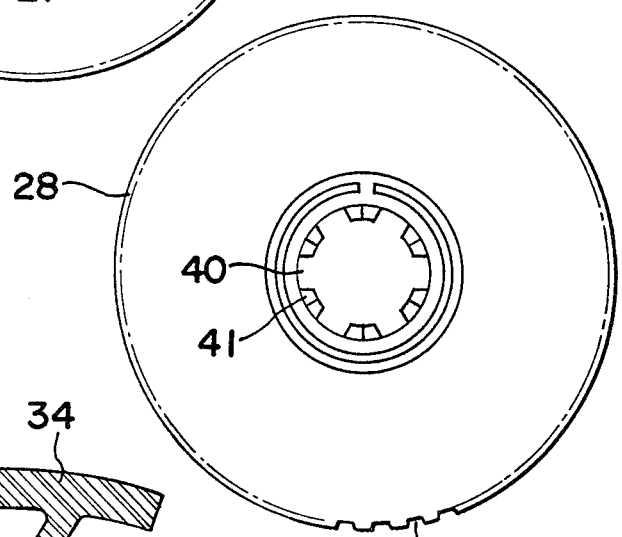
FIG. 16 is a bottom plan view of the lower flange of FIG. 15.

As shown in FIG. 16, the hub 27 has in its lower portion a concavity 40 for receiving a drive shaft of a recording/reproducing apparatus, which has a plurality of projections 41 formed at regular intervals in its periphery for transmitting driving force to the magnetic recording tape. When the reels 6 are placed on predetermined positions of the bottom section 1B, the concavities 40 of the hub 27 are properly located on the through-holes 4 of the bottom section 1B.

Figure 18:
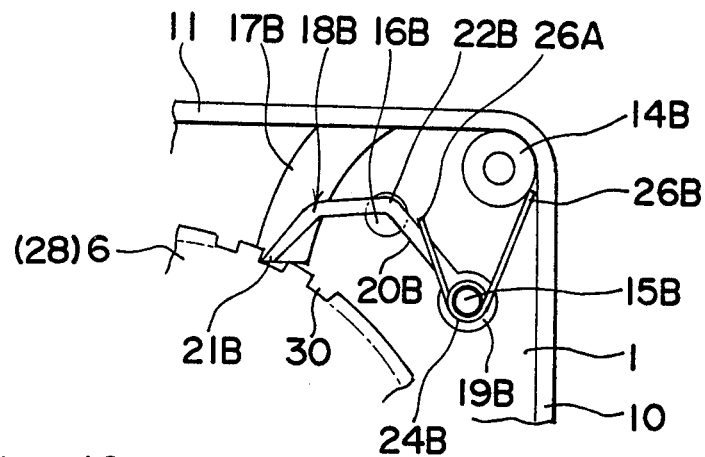
FIG. 18 is an enlarged top plan view of the member for preventing rotation of the reel in a condition the reel is prevented from rotation.

Upon placement of the reels 6 on the predetermined positions of the top section 1A, the rotation preventing member 18 and the spring member 24 are respectively engaged with the pivotal shafts 15 and the pawls 21 of the rotation preventing member 18 are engaged in the teeth 30 of the reels 6 to prevent rotation of the reels 6. In this condition, the bent portions 22 of the receiving members 20 of the rotation preventing members 18 are located above the circular holes 16 as shown in FIGS. 7, 12 and 18.

Figure 19:
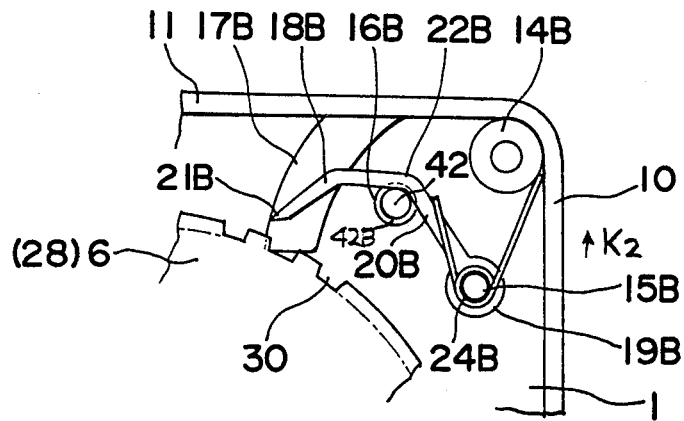
FIG. 19 is an enlarged top plan view of the member for preventing rotation of the reel in a condition the reel is allowed to rotate.

When the magnetic recording tape cartridge is mounted on a recording/reproducing apparatus and is lowered therein, top ends of standard pins 42 (FIGS. 12 and 19) pass through the circular holes 16 to be in contact with the lower ends of the receiving members 20 of the rotation preventing members 18. Since the receiving members 20 are provided in lower ends with the inclined portion 23, the receiving members 20 are pushed back by the standard pins 42 against the elastic restoring force of the spring members 24 so that the rotation preventing members 18 rotate about the pivotal shaft 15 toward the rear wall 11 of the bottom section 1B. Then the pawls 21 are disengaged from the teeth 30 of the reels 6 to release the reels 6 so that they can freely rotate (see FIG. 19).

By provision of the bent portions 22 in the receiving members 20 in portions opposite to the circular holes 16, the rotation preventing members 18 can be smoothly and securely engaged with the standard pins 42.

Further, the magnetic recording tape cartridge is properly located in a predetermined position, i.e., a standard position in the recording/reproducing apparatus by engagement of the standard pins 42 and the circular holes 16A and 16B of the bottom section 1B. In this case, the rotation preventing members 18A and 18B are respecitvely brought in contact with the outer peripheries of the standard pins 42 by elastic force of the spring members 24 displacing the magnetic recording tape cartridge rearwardly as shown in an arrow mark K2 in FIG. 19 to cause the opposite side 42B of the standard pin 42 to contact the inner peripheral edge of the hole 16B thereby securing proper location of the magnetic recording tape cartridge.

When the magnetic recording tape cartridge is removed from the recording/reproducing apparatus, the standard pins 42 are disengaged from the circular holes 16 so that the rotation preventing members 18 are rotated against the reels 6 by restoring force of the spring members 24 and the pawls 21 are again engaged with the teeth in the outer peripheries of the reels 6 to prevent rotation of the reels 6.

The receiving member 20 of the rotation preventing member 18 in this embodiment is provided with the bent portion 22 which is L-shaped in plan view, though, the bent portion 22 may be Ω-shaped in plan view. Further, though the inclined portion is provided substantially along the entire length of the lower end of the receiving member 20 in this embodiment, the inclined portion 23 may be provided only in the lower end of the bent portion 22 and in the vicinity thereof.

Figure 20:
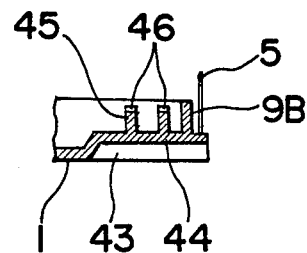
FIG. 20 is a partial cross sectional view taken along the line II—II in FIG. 7.

As shown in FIGS. 6, 8 and 20, a groove 43 for engagedly receiving a member (not shown) for preventing erroneous mounting of the cartridge onto the recording/reproducing apparatus is provided in the lower portion of the front wall 9B of the bottom section 1B in a position slightly deviated from the center thereof. In order to facilitate forming of the groove 43, the bottom section 1B is formed in its bottom face with a trapezoidal raised portion 44. A part of the raised portion 44 extending beyond the front wall 9B functions to support the magnetic recording tape 5 keeping the same in a normal position. Thus, while the magnetic recording tape 5 is stopped, the intermediate portion of the tape 5 extending along the front surface of the magnetic recording tape cartridge is supported by the raised portion 44 in a slightly raised condition (see FIGS. 6 and 20).

The bottom section 1B is further provided rearwardly of the front wall 9B with a pair of supporting projections 45 extending substantially in parallel with the front wall 9B, which are respectively provided in the upper surfaces with groove-shaped bearings 46. A lock lever 47 having a rectangular portion is rotatably suspended between the supporting projections 45 by a pair of pins projecting from both sides of the lock lever, being rotatably mounted in the grooves of the bearings 46, the details of the lock lever 47 will be hereinafter described. Further, in the vicinity of the raised portion 44, there is formed a slightly elongated hole 48 for receiving a release pin which is provided in the recording/reproducing apparatus.

Since the bearings 46 are designed to have a depth of which size is substantially identical with that of the diameter of the rotating pins 49, the rotating pins 49 are fully received in the grooves of the bearings 46 without projecting outwardly from the upper surface of the supporting projections 45. The top section 1A is provided in its inner surface also with a pair of supporting projections 62 which are opposite to the supporting projections 45 of the bottom section 1B, though, the supporting projections 62 of the top section 1A have flat lower surfaces. Upon assembling of the top section 1A and the bottom section 1B, the rotating pins 49 are rotatably supported between the supportng projections 45 and 62 without being shaken (see FIG. 22).

Figure 21:
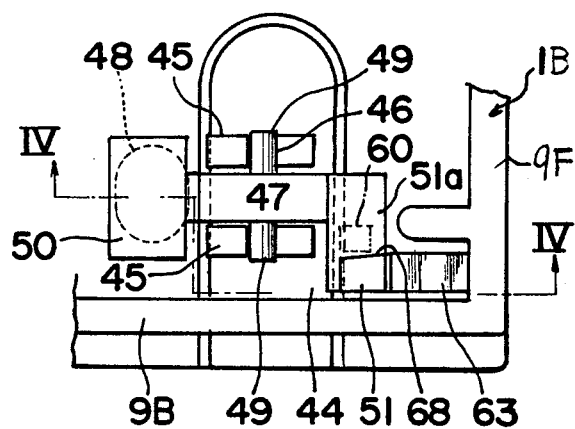
FIG. 21 is an enlarged top plan view of a part of the bottom section showing the condition of disposition of a lock lever.
Figure 22:
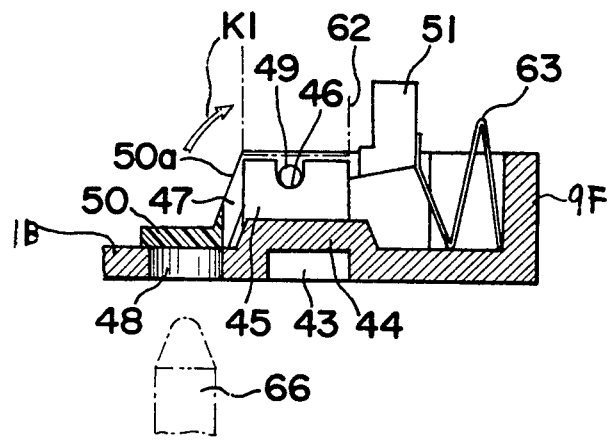
FIG. 22 is a partial cross sectional view taken along the line IV—IV in FIG. 21.
Figure 23:
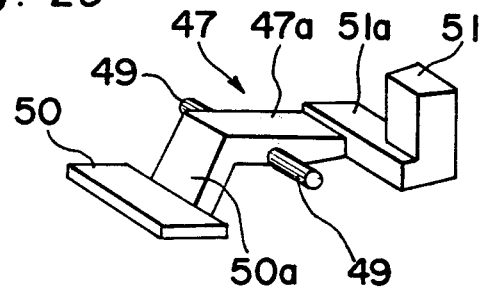
FIG. 23 is a perspective view of the lock lever.

As shown in FIGS. 21 to 23, the lock lever 47 comprises on its one end a pressing member 50 in the form of a plate which is connected with the intermediate portion 47a of the lever 47 through an inclined connecting plate 50a with the height of the pressing member 50 being lower than the intermediate portion 47a. On the other end of the lock lever 47 there is provided a stop member 51 which is projected upwardly from one end of a connecting plate 51a connected with the other end of the intermediate portion 47a.

The lock lever 47 is so suspended on the bearings 45 that the pressing member 50 is opposed just above the hole 48 defined in the bottom plate of the bottom section 1B and the stop member 51 is located near the corner defined by the front wall 9B and the connecting wall 9F. A plate spring 63 bent in the form of a bellows is inserted between the stop member 51 of the lock lever 47 and the connecting wall 9F, so that the lock lever 47 is elastically biased by the plate spring 63 to close the elongated hole 48 by the pressing member 50. The stop member 51 of the lock lever 47 is slidably in contact with the plate spring 63 so that the stop member 51 may be inclined toward the plate spring 63 compressing the same. The lock lever 47 functions to prevent opening, i.e., rotation, of the lid member 3, which now is placed in a closed condition.

As shown in FIGS. 4 to 6, the rotatable lid member 3 comprises an elongated flat front plate 52, an upper plate 53 projected in a vertical direction from the front plate 52 and a pair of end plates 54 projected from both ends of the front plate 52 in the same direction as the upper plate 53, and the end plate 54 as shown in the left-hand direction and the other end plate 54 as shown in the right-hand direction are respectively provided with inwardly projecting first and second pins 55 and 56 (FIG. 25). The rotatable lid member 3 is rotatably supported by the top section 1A with the pivotal pins 55 and 56 rotatably engaged in receiving holes 57 (FIG. 39) defined in both side surfaces of the top section 1A. The rotatable lid member 3 is continuously elastically biased to a closed position by a coiled spring 65 which is loosely fitted with the first pivotal pin 55 with one bent end 64A in contact with the rotatable lid member 3 and the other bent end 64B in contact with the top section 1A.

As shown in FIGS. 5 and 24, a recess 58 for receiving the erroneous insertion preventing member of a recording/reproducing apparatus (not shown) is provided in the lower end of the front plate 52 of the lid member 3 in a portion opposite to the groove 43 of the bottom section 1B. Further, a pair of recesses 59 for receiving locating members (not shown) provided within a magnetic recording tape cartridge holder of the recording-/reproducing apparatus are formed in both ends of the lower portion of the front plate 52. As shown in FIGS. 25 and 26, the upper plate 53 is provided in its side with a downwardly extending hook-shaped member 60 in a portion opposite to the lock lever 47. The hook-shaped member 60 passes through a hole 61 defined in the top section 1A to extend toward the stop member 51 of the lock lever 47 (see FIGS. 4 and 28).

The operation of the rotatable lid member 3 and the lock lever 47 will hereinafter be described. In FIGS. 21, 22, 28 and 30, the rotatable lid member 3 is shown in a closed condition. As hereinabove described, the receiving hole 48 is covered by the pressing member 50 of the lock lever 47 by the pressing force of the plate spring 63. The stop member 51 is, as shown in FIG. 28, positioned ahead of the direction of rotation of the hook-shaped member 60 of the rotatable lid member 3 to prevent rotation of the same. Thus, by engagement of the stop member 51 and the hook-shaped member 60, the rotatable lid member 3 is locked in a closed position not to be opened even by external force.

Figure 29:
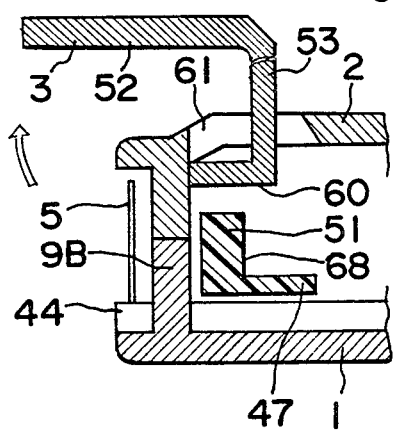
FIG. 29 is an enlarged cross sectional view of a principal part of the rotatable lid member in which the lid member is opened.
Figure 31:
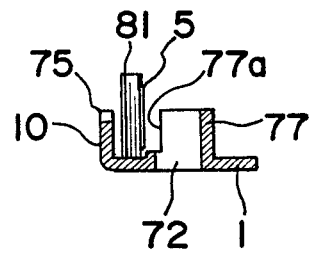
FIG. 31 is a partial cross sectional view taken along the line III—III in FIG. 7.

When the magnetic recording tape cartridge is mounted in the recording/reproducing apparatus, the release pin 66 (FIG. 22) is inserted into the elongated hole 48 to upwardly press the pressing member 50 against the elasticity of the plate spring 63, thereby rotating the lock lever 47 clockwise about the rotating pin 49 as indicated by an arrow mark K1 in FIG. 22. By virtue of this, the plate spring 63 is compressed and the stop member 51 is lowered as shown in FIGS. 28 and 29. Thus the stop member 51 is disengaged from the hook-shaped member 60 so that the lid member 3 is made rotatable.

Figure 30:
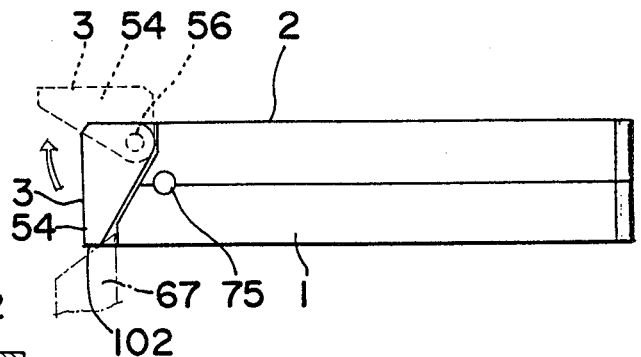
FIG. 30 is a side elevational view of the magnetic recording tape cartridge showing opening movement of the rotatable lid member.

Then, as shown in FIG. 30, the lower end of the rotatable lid member 3 is pushed up by a lid opening member 67 to be opened against the expanding force of the coiled spring 65 which functions to close the rotatable lid member 3. When opened, the rotatable lid member 3 comes in a position indicated by broken lines in FIG. 30.

The rotatable lid member 3 is provided in both ends of its lower surface with flat plates 102 for engaging with the lid opening member 67 so as to facilitate opening of the lid member 3 by the lid opening member 67, and each of the flat plates 102 has in the central portion a small hole 101 extending near the upper plate 53 for preventing warping deformation by contraction during molding of the end plate 54 defining the flat plate 102 (see FIG. 24).

When the magnetic recording tape cartridge is removed from the recording/reproducing apparatus, separating from the lid opening member 67, the rotatable lid member 3 is rotated to its closed position by restoring force of the coiled spring 65. On the other hand, the release pin 66 is disengaged from the elongated hole 48 of the bottom section 1B so that the stop member 51 is upwardly pressed by restoring force of the plate spring 63 forwardly of the direction of rotation of the hook-shaped member 60 to be in contact therewith while the pressing member 50 closes the open end of the elongated hole 48 to complete the locking operation. The side 68 of the stop member 51 coming in contact with the hook-shaped member 60 is preferably inclined or rounded for facilitating movement of the stop member 51 forward of the direction of rotation of the hook-shaped member 60.

Though the plate spring 63 is provided rearward of the stop member 51 in this embodiment, the pressing member 50 may be elastically pressed toward the elongated hole 48 by interposing a spring member such as a coiled spring between the pressing member 50 and the top section 1A.

Figure 44:
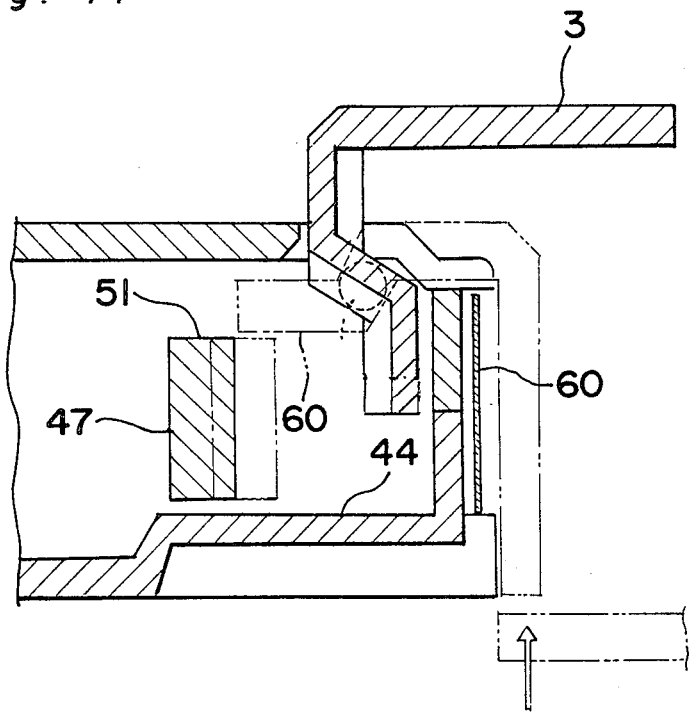
FIG. 44 is an enlarged view of a lock lever of a modified locking mechanism for the rotatable lid member.
Figure 45:
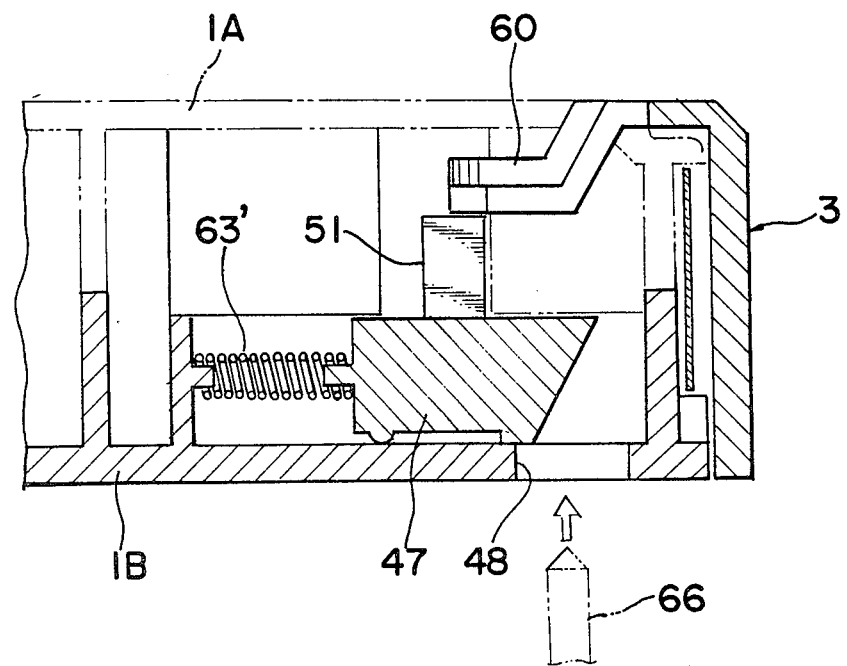
FIGS. 45 and 46 are views respectively showing operation of the lock lever 47 shown in FIG. 44.

FIGS. 44 and 45 show another embodiment of the lid lock member 47 in which when the releasing pin 66 is inserted into the interior of the cartridge case, the lock member 47 is displaced to a position shown in the shaded part away from below the hook-shaped member 60, so that the lock between the stop member 51 and the hook-shaped member 60 is released.

Figure 46:
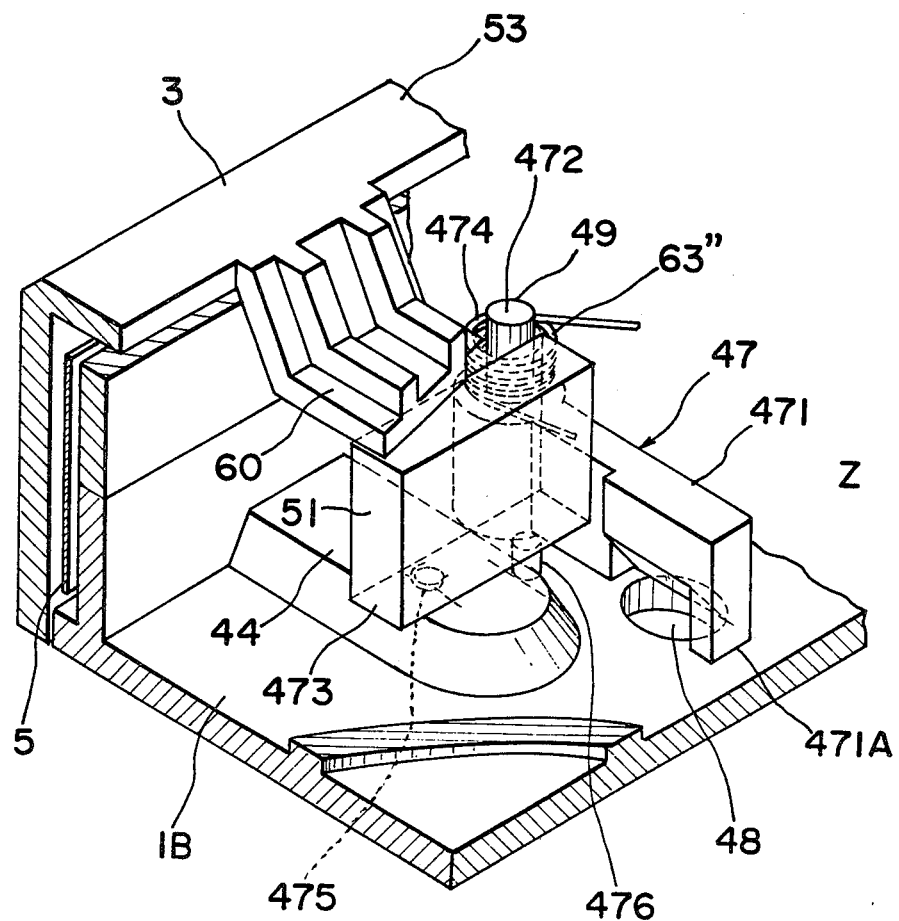

FIG. 46 shows a further embodiment of the lock member wherein the lock member 47 comprises a first engaging plate 471 rotatably supported on the pivotal pin 472 with the one end 471A opposed to the elongated hole 48 and a second engaging plate 473 projected perpendicularly to the first engaging plate 471 with the upper surface of the second engaging plate 473 placed below the hook-shaped member 60. A coiled spring 474 is loosely fitted on the pivotal pin 472 with one end thereof engaged with the second engaging plate 473 and the other end thereof engaged with the possible fixed member (not shown) so as to bias the lock member 47 to the normal position where the hook-shaped member 60 is faced with the second engaging plate 473 to lock the rotatable lid member 3 in the closed position.

By this arrangement, when the cartridge case is mounted on the recording/reproducing apparatus, the release pin is inserted into the interior of the cartridge case through the hole 48 to rotate the lock member 47 in an anticlockwise direction about the pivotal pin 472, then the second engaging plate 473 is removed from the hook-shaped member 60 to allow the rotation of the lid member 3 to an opened position.

In order to decrease frictional force between the bottom face of the second engaging plate 473 and the raised portion 44, a small projection 475 may be provided in the bottom face of the second engaging plate 473. In addition, a stopper 476 is projected on the bottom face of the bottom section 1B to engage with the first engaging plate 471 to prevent rotation of the lock member 47 in a clockwise direction beyond the normal position.

As shown in FIGS. 5 and 7, a circular through-hole 69 is formed in the front portion of the bottom section 1B a predetermined distance from the elongated hole 48. The elongated hole 48 and the through-hole 69 make a pair to receive a location auxiliary pin (not shown) for locating the magnetic recording tape cartridge in a predetermined position within the recording/reproducing apparatus.

As shown in FIG. 7, the bottom section 1B is provided in both end portions of the front surface with a pair of bosses 14C and 14D for engaging respectively with fastening screws and in the substantially central portion of the front surface forward of the junction 7C of the front inner walls 7A and 7B with a similar boss 14E.

A hollow pin 70 is rotatably fitted outwardly of each of the bosses 14C and 14D so that the respective hollow pins 70 act to guide the magnetic recording tape 5 when it runs. As each of the bosses 14C and 14D acts as a support member of the hollow pin 70, it is advantageous that the space occupied by the taper guide members can be decreased compared to such a case where the tape guide members are provided separately from the respective bosses for the fastening screws.

Holes 72 are formed rearwardly of the hollow pins 70 to receive cylindrical light sources (not shown) for detecting the forward and rear ends of the magnetic recording tape 5. The top section 1A is, as shown in FIG. 33, provided in positions opposite to the holes 72 of the bottom section 1B with a pair of concavities 73 for receiving the cylindrical light sources. Further, the side walls 10 and 74 of the top section 1A and the bottom section 1B are provided in positions opposite to the through-holes 72 and the concavities 73 with semicircular recesses 75 to define a circular hole 75 for receiving the light source upon assembling of the top section 1A and the bottom section 1B as shown in FIG. 39.

When the magnetic recording tape cartridge is set in the recording/reproducing apparatus, the cylindrical light sources are inserted into the holes 72 and the concavities 73, and a light receiving element 76 having a photo diode opposite to the light source is placed on the side surface of the magnetic recording tape cartridge (see FIG. 7). In operation, the magnetic recording tape 5 runs traversing between the light source and the light receiving element 76 and 76' and the forward and rear ends of the magnetic recording tape 5 are respectively connected with light-permeable leader tapes (not shown) made of polyester films.

The forward end of the magnetic recording tape 5 is detected by the cylindrical light source inserted into the through-hole 72 existing in the left-hand portion in FIG. 7 and the light receiving element 76, and the rear end of the same is detected by the light source inserted into the through-hole 72' existing in the right-hand portion in FIG. 7 and the light receiving element 76' respectively. That is, the forward end of the magnetic recording tape 5 is detected by the light receiving element 76 sensing an optical change of rays of light irradiated toward the leader tape and the magnetic recording tape 5 from permeation to interception, and the rear end of the magnetic recording tape 5 is detected by the light receiving element 76' sensing an optical change of said rays of light from interception to permeation.

To precisely conduct the optical detection of the forward and rear ends of the magnetic recording tape 5 without being affected by any noise, the magnetic recording tape cartridge according to the present invention is designed as follows: First, the sensor members, i.e., the cylindrical light sources and the light receiving elements are independently disposed for detecting the forward end and for detecting the rear end. Second, the through-hole 72 is provided in the vicinity of the side wall 10 of the bottom section 1B to make the distance of the light path from the light source to the light receiving element 76 as short as possible. Third, a cylindrical shield wall 77 is formed around the through-hole 72 with a window 77a formed in a part opposing to the light penetrating hole 75 to give a directivity of light of the cylindrical light source relative to the light receiving element 76 preventing dispersion of light. Fourth, for preventing influence by outside light passing through a window 78 formed in the top section 1A for displaying the volume of windings of the magnetic recording tape 5, the front inner walls 7A and 7B of the bottom section 1B are connected with each other to extend near the side walls 10 and the front inner walls 79A and 79B of the top section 1A are also connected with each other to extend near the side walls 74 to prevent the outside light entering the window 78 from reaching the light receiving elements 76. Fifth, a pin-shaped first guide member 80 in the form of a projecting pin and a second guide member in the form of a free roller 81 are successively provided between the hollow pin 70 which functions as one of the guide members for the magnetic recording tape 5 and the reel 6 along the path of the recording tape 5 to make the magnetic recording tape 5 run in a zigzag manner along the first and second guide members 80 and 81 and the hollow pin 70 functioning as a third guide member so that the magnetic recording tape 5 is guided in the vicinity of the outer peripheries of the through-hole 72 and the concavity 73 to make the distance between the light source and the magnetic recording tape 5 as short as possible. The magnetic recording tape 5 is prevented from being loosened in the vicinity of the through-hole 72 upon stoppage by being carried in a zigzag manner along the first and second guide members 80 and 81 and the hollow pin 70 in a relatively short distance, and the end of the magnetic recording tape 5 can be correctly detected simultaneously with the starting thereof.

The shapes of the guide members 70, 80 and 81 can be optionally selected depending on factors such as tension on the magnetic recording tape 5 during operation.

Further, though the front inner walls 7A, 7B, 79A and 79B, functioning as shielding members, are provided in the top and bottom sections 1A and 1B in the embodiment, the front inner walls may be provided only in one of the sections to extend near the other section.

As shown in FIG. 7, the boss 14E in the bottom section 1B is, different from the other bosses 14A to 14D, provided between the two reels 6, and is relatively near the reels 6. It tends to occur that when a tapping screw 82 (FIG. 7) is threadedly engaged with the boss 14E during assembling of the top and bottom sections 1A and 1B, scraps of synthetic resin possibly enter the interior of the cartridge case through a clearance in the juncture of the top and bottom sections 1A and 1B to damage the magnetic recording tape 5. For preventing this, the front inner walls 7A and 7B are elongated and connected at a position between the boss 14E and the peripheral edge of the reels 6 so that the boss 14E is enclosed in a chamber 83 defined by the front inner walls 7A and 7B and the front wall 9B, whereby the boss 14E can be separated from the reels 6.

Figure 32:
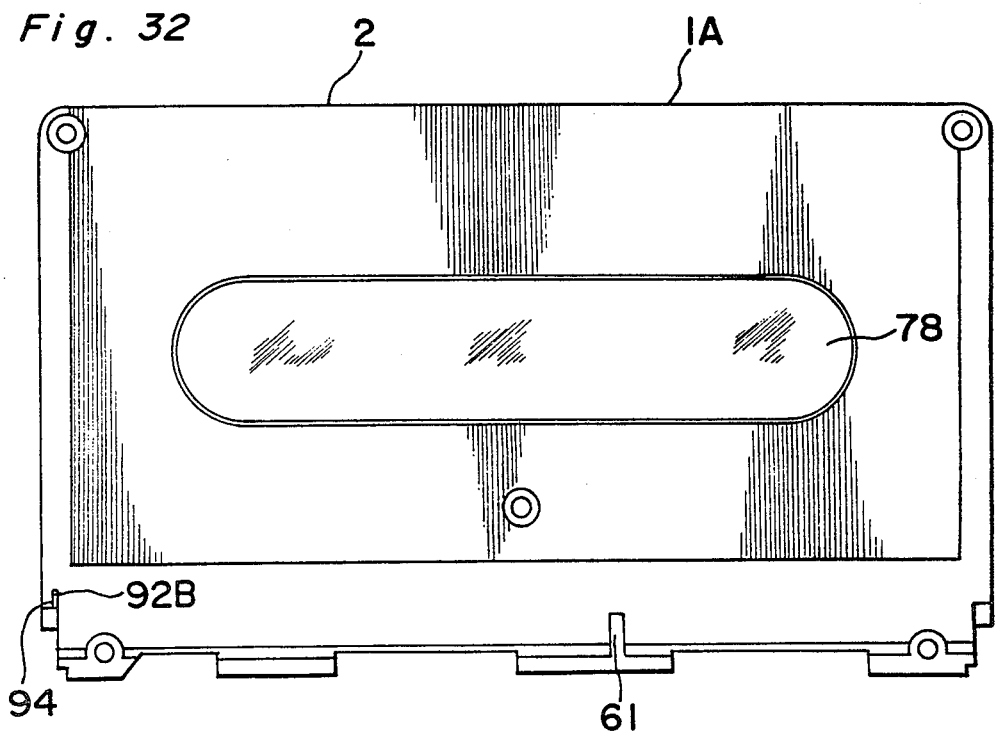
FIG. 32 is a top plan view of the top section.

As shown in FIGS. 32 and 33, the window 78 for comprehending the amount of tape 5 wound on the respective reels 6 is formed by a relatively long transparent synthetic resin plate extending over both reels 6. By this arrangement, the condition of the magnetic recording tape 5 in use is precisely comprehended by examining the difference in volume of windings of the tape 5 between the retracting reel 6 and the take up reel 6', for reducing the number of parts of the window 78 and the processes of mounting the same to the top section 1B and for a requirement in design. In this embodiment, therefore, the spring plate 84 is provided between the window 78 and the rear wall 85 of the upper case 2 as shown in FIG. 33.

A generally U-shaped spring plate 84 is secured to the bottom face of the top section 1A to press the both of the reels 6 toward the bottom section 1B. The spring plate 84 is made of, for example, a thin plate of stainless steel, substantially U-shaped in plan view as shown in FIGS. 33 and 35, and comprises a central base portion 86 and a pair of pressing members 87 extending toward the reels 6. The pressing members 87 have flat portions 88 coming in contact with pointed ends of the central projections 38 of the reels 6. As shown in FIG. 33, the top section 1A has in its inner surface opposite to the spring plate 84 a shallow recess 89 for widening the allowable range of vertical movement of the spring plate 84.

FIGS. 37 and 38 respectively show a modification of the spring plate 84, which is generally V-shaped in plan view.

Since the spring plate 84 is provided between the window 78 and the rear wall 85 of the top section 1A, there is no space to form a central rear wall for controlling the location of the reels 6 in the top section as provided in the prior art. Such a control wall is provided in the bottom section 1B as hereinabove described. By this arrangement, the central portion of the rear wall 85 of the top section 1A may be weak in terms of its shock-proof property and tends to be deformed when the top section 1A is removed from a mold after the molding of the top section is completed, and thus the rear wall 85 is integrally provided in its interior with reinforcing ribs 90 (see FIGS. 33 and 34).

Further, in this embodiment, the top and bottom sections 1A and 1B are also respectively provided with reinforcing ribs 90 for improving the shock-proof property of the boss 14E and the shield wall 77 and preventing the same from being deformed when the top section 1A and the bottom section 1B are removed from corresponding molds after forming.

Provision of the reinforcing ribs 90 further improve the fluidity of the synthetic resin within the molds for forming the both sections 1A and 1B.

The order of assembling of the magnetic recording tape cartridge as hereinabove explained will be hereinafter described.

The retracting reel 6 and the take-up reel 6 are placed on the bottom section 1B and the magnetic recording tape 5 is set thereon in a predetermined condition. Then the top section 1A is placed (FIG. 39) to be assembled with the bottom section 1B and fastened together by the tapping screws 82.

Figure 41:
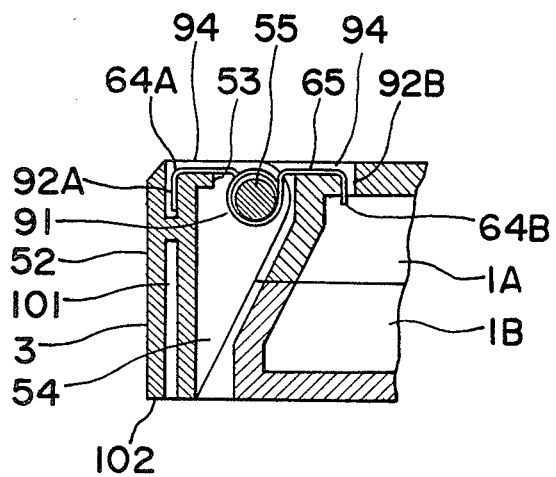
FIG. 41 is a partial enlarged cross sectional view of a principal part of the magnetic recording tape cartridge showing engagement of the cartridge case and the rotatable lid member.

Apart from this, a coil-like portion 91 of the coiled spring 65 for elastically pressing the rotatable lid member 3 is loosely fitted with the first pivotal pin 55 of the rotatable lid member 3. As shown in FIG. 41, the coiled spring 65 comprises a pair of free ends horizontally extending from both sides of the coil-like portion 91 to define downwardly bent end portions 64A and 64B. As hereinabove described, the coil-like portion 91 of the coiled spring 65 is loosely fitted with the first pivotal pin 55 and one bent end portion 64A is inserted into a hole 92A formed in the end of the upper plate 53 of the rotatable lid member 3 whereby the other bent end portion 64B is upwardly manually raised against the elasticity of the coiled spring 65.

Under this condition, the first pivotal pin 55 of the rotatable lid member 3 is inserted into the supporting hole 57 formed in the side wall 74 of the top section 1A as shown in FIG. 37 and the other bent end portion 64B of the coiled spring 65 is inserted into a hole 92B formed in the upper surface of the top section 1B (see FIGS. 32 and 41).

Figure 42:
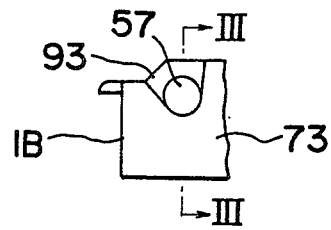
FIG. 42 is a partial enlarged side elevational view of a part of the top section in the vicinity of a supporting hole.
Figure 43:
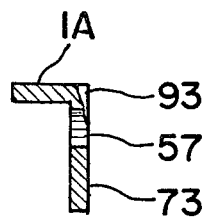
FIG. 43 is a partial cross sectional view taken along the line VIII—VIII in FIG. 42.

Then the rotatable lid member 3 is slightly bent and the second pivotal pin 56 is inserted into another supporting hole 57 formed in the side wall 74 of the top section 1A. For facilitating smooth insertion of the second thread pin 56, the rotatable lid member 3 may be made of acryl-nitryl synthetic resin such as a copolymer of acryl nitryl styrene and copolymer resin of acryl nitryl-butadiene-styrene to have flexibility, and as shown in FIGS. 36, 39 and 40, a guide groove 93 may be provided from the end of the side wall 73 of the top section 1A toward the supporting hole 57. The guide groove 93 is, as shown in FIG. 42, inclined at the bottom so that the side near the end of the side wall 73 of the top section 1A is made deeper than the side near the supporting hole 57.

The second pivotal pin 56 is engaged in the supporting hole 57 so that the downwardly extending hook-shaped member 60 formed in the rotatable lid member 3 is inserted into the interior of the cartridge case through the hole 61 formed in the top section 1A. Thus, the rotatable lid member 3 can be rotatably mounted on the top section 1A and is biased to the closed position by the restoring force of the coiled spring 65. On the other hand, the free end of the hook-shaped member 60 thus inserted in the interior of the top section 1A is engaged with the rear end of the stop member 51 thereby causing the lid member 3 to be locked in the closed position. Thus, assembling of the magnetic recording tape cartridge is completed.

In the vicinity of the holes 92A and 92B, there are respectively formed receiving grooves 94 for securely retaining the coiled spring 65 extending from the rotatable lid member 3 over the top section 1A in the predetermined position so that it does not project beyond the upper surfaces of the rotatable lid member 3 and the top section 1A. Since no projection member is formed on the outer peripheries of the pivotal pins 55 and 56, the pins 55 and 56 may be inserted into the supporting holes 57 after the top and bottom sections 1A and 1B are assembled each other in the aforementioned manner.

When the magnetic recording tape cartridge is not in use, the magnetic recording tape 5 is somewhat raised at the substantially central portion being exposed in the front surface of the cartridge case by the raised portion 44 of the bottom section 1B so that the magnetic tape 5 is prevented from being loosened as shown in FIG. 6. When the magnetic recording tape cartridge is set in the recording/reproducing apparatus, the reels 6 are somewhat raised upwardly against the elasticity of the spring plate 84 by the drive shaft inserted into the concavity 40 of the reel 6, and the magnetic recording tape 5 is moved upwardly following thereto, so that the bottom edge of the magnetic recording tape 5 is separated from the raised portion 44. The magnetic recording tape 5 tends to widely move vertically especially when running along the front surface of the cartridge case, though, provision of the raised portion 44 controls the vertical movement of the magnetic recording tape 5 to facilitate stable running of the tape and prevent the ends of the magnetic recording tape from being damaged by the vertical vibration.

As hereinabove described, when the downwardly extending hook-shaped member is provided in a substantially central portion of the longitudinal direction of the rotatable lid member, opening of the end of the rotatable lid member by distortion is reduced in comparison with that in the conventional magnetic recording tape cartridge even under external force for opening the rotatable lid member, and thus the magnetic recording tape is securely protected and there is provided a highly reliable magnetic recording tape cartridge having high commercial value.

Since the lock lever of the present invention can be provided in any position corresponding to the longitudinal direction of the rotatable lid member and therefore in a portion having a relatively wide space, no special chamber therefor is required and there is no need to make a space between the rotatable lid member and the bottom section for receiving the release pin of a tape player. Thus, the magnetic recording tape cartridge can be diminished in size and is easily designed since the position of the lock lever is not strictly limited. Further, since the release pin is inserted into the cartridge case from the lower portion of the bottom section, the magnetic recording tape will not be damaged by the release pin.

Since the tape reel stopping elastic member whose base portion is connected with the cartridge case is in contact with the outer periphery of the standard pin of the recording/reproducing apparatus to continuously press the same in the diametrical direction, the magnetic recording tape cartridge will not horizontally deviate when mounted in the recording/reproducing apparatus and is kept in a predetermined position so that an appropriate relationship in position is obtained between the magnetic recording tape and the magnetic head of the recording/reproducing apparatus with no shaking and excellent recording/reproducing characteristic are obtained.

Further, as explained hereinabove, when the tape reel stopping elastic member is made inclined at the end opposing to the through-hole for receiving the standard pin, displacement of the elastic member can be smoothly conducted by contact with the top end of the standard pin. In addition, when the side of the tape reel stopping elastic member is bent, the magnetic recording tape cartridge can be further securely located and kept in the predetermined position by elastic contact with the standard pin and engagement of a part of the outer periphery of the standard pin with the bent portion of the elastic member.

What is claimed is:

1. A magnetic recording tape cartridge comprising:
   a bottom section and a top section assembled together by fastening means so as to provide a cartridge case having a front wall with a plurality of openings formed therein, said cartridge case defining a tape chamber for containing a magnetic recording tape wound around at least one reel housed in said tape chamber, with a portion of said recording tape being stretched along a predetermined intermediate path defined by said front wall;
   a lid member comprising an engaging member projected from said lid member, a front portion and an upper portion hinged to said cartridge case for movement between a closed position to close said openings of said front wall and an opened position which exposes said openings, said lid member being releasable locked in said closed position by a locking means mounted on said bottom section, said locking means comprising a stop member which engages with the engaging member to lock said lid member; and
   an opening defined in said bottom section of said cartridge case for allowing passage of a lock releasing member of a recording/reproducing apparatus such that, when said cartridge case is mounted in said recording/reproducing apparatus, said lock releasing member will enter said cartridge case from below and engages with said locking member through sdid opening so as to disengage said stop member from said engaging member, thereby releasing said locking of said lid member, characterized in that said stop member is exerted toward a locking position in a locus of movement of the engaging member of the lid member, that said stop member is positioned in said locking position when the lock releasing member is not engaged with said locking means so as to prevent movement of the engaging member and is moved to an unlocking position out of the locus of the movement of the engaging member when the lock releasing member is engaged with the locking means thereby making the engaging member move freely to allow the lid member to move between the closed position and the opened position, the direction of the movement of the stop member and the direction of the movement of the engaging member of the lid member being in parallel planes.

2. The magnetic recording tape cartridge of claim 1, wherein said lid member is hinged on said top section of said magnetic recording tape cartridge.

3. The magnetic recording tape cartridge according to claim 1, further including a means for locating said cartridge case in a standard position of a recording/reproducing apparatus, said means comprising at least one opening defined in said bottom section of said cartridge for receiving a standard pin of said recording/reproducing apparatus and a locating member having a free end movable supported on said bottom section and resiliently biased so that said free end of said locating member can be slidably engaged and pressed in a direction of the radius of said standard pin when said pin is inserted into said opening.

4. A magnetic recording tape cartridge according to claim 1 wherein said engaging member of said lid member comprises a hook-shaped member which projects into the interior of said cartridge case from said upper portion of said lid member through an opening defined in said top section of said cartridge.

5. A magnetic recording tape cartridge according to claim 1 wherein said locking means is rotatably mounted by pivotal shafts mounted on a base member projected from said bottom section.

6. A magnetic recording tape cartridge according to claim 1 wherein said locking means further includes an inclined plate which terminates as a pressing member for engaging with said releasing member of the recording/reproducing apparatus.

7. A magnetic recording tape cartridge according to claim 1 wherein said reel comprises a flange provided with a plurality of toothed portions on the outer periphery thereof and further including a reel locking means provided in the interior of said cartridge case for engaging with at least one of said toothed portions of said reel to prevent rotation of said reel and a hole defined in said bottom section to allow insertion of a release pin of a recording/reproducing apparatus for disengaging said reel locking means.

8. A magnetic recording tape cartridge according to claim 7 wherein said reel locking means is provided with an inclined surface for engagement with said release pin.

9. A magnetic recording tape cartridge according to claim 7 wherein said reel locking means is rotatably supported by a pivotal shaft mounted on a base member projected from said bottom section.

10. magnetic recording tape cartridge according to claim 7, wherein said reel locking means is provided with an arm at the intermediate portion thereof bent at the position which engages said release pin.

11. A magnetic recording tape cartridge according to claim 3, wherein said free end of said locating member is provided with an inclined portion on a face opposed to said standard pin so as to slidably engage with said standard pin.

* * * * *